US006845239B1

United States Patent
Sato et al.

(10) Patent No.: US 6,845,239 B1
(45) Date of Patent: Jan. 18, 2005

(54) POSITIONING SYSTEM AND POSITION CALCULATING METHOD IN MOBILE COMMUNICATION SYSTEM

(75) Inventors: Tsuyoshi Sato, Tokyo (JP); Shinichi Hirata, Tokyo (JP); Ouichi Oyamada, Tokyo (JP)

(73) Assignee: Kokusai Electric Co., Ltd, Tokyo (JP)

( * ) Notice: Subject to any disclaimer, the term of this patent is extended or adjusted under 35 U.S.C. 154(b) by 782 days.

(21) Appl. No.: 09/712,242

(22) Filed: Nov. 15, 2000

(30) Foreign Application Priority Data

Nov. 15, 1999 (JP) ............................................ 11-323759
Apr. 11, 2000 (JP) ...................................... 2000-109145
Apr. 11, 2000 (JP) ...................................... 2000-109146

(51) Int. Cl.$^7$ ............................. H04Q 7/20; H04B 7/26
(52) U.S. Cl. ................. 455/456.1; 455/424; 455/67.11; 455/404.2; 455/422.1; 342/457; 709/218; 701/207
(58) Field of Search .......................... 455/456.1, 456.2, 455/456.3, 456.4, 456.5, 456.6, 457, 422.1, 502, 404.2, 427, 4, 67.11, 500; 340/990–995.19; 701/200–206; 709/218; 342/357.01–357.17, 457, 463, 464

(56) References Cited

U.S. PATENT DOCUMENTS

| | | | | |
|---|---|---|---|---|
| 5,699,255 A | | 12/1997 | Ellis et al. ................... 364/449 |
| 5,732,354 A | * | 3/1998 | MacDonald ............. 455/456.2 |
| 5,960,355 A | * | 9/1999 | Ekman et al. ............ 455/456.1 |
| 6,701,132 B1 | * | 3/2004 | Fukuzawa et al. .......... 455/561 |

FOREIGN PATENT DOCUMENTS

| | | |
|---|---|---|
| EP | 0341738 A2 | 5/1989 |
| JP | 01-233930 | 9/1989 |
| JP | 05-211470 | 8/1993 |
| JP | 07-181242 | 7/1995 |
| JP | 07181242 | 7/1995 |
| JP | 10/013961 | 1/1998 |
| JP | 10/178674 | 6/1998 |
| WO | WO00/75684 | 12/2000 |

* cited by examiner

*Primary Examiner*—David Hudspeth
*Assistant Examiner*—Kamran Afshar
(74) *Attorney, Agent, or Firm*—Jacobson Holman

(57) ABSTRACT

A positioning system and a position calculating method in a mobile communication system for specifying a position of a mobile station unit on the basis of positional information from three base station units and for displaying related map information on the mobile station unit to utilize the positional information effectively, the position system and the position calculating method in which a position reporting means of a base station unit reports positional information, a distance difference calculating means of the mobile station unit calculates differences in distance between the mobile station unit and three base station units on the basis of the positional information from the three base station units, measures a position of the mobile station unit on the basis of the positional information and the distance differences by using a position measuring means, reports the measured position to an exchange unit by using a position reporting means, and a map information displaying means of the mobile station unit displays related map information reported from the exchange unit.

17 Claims, 10 Drawing Sheets

POSITIONING SYSTEM AND POSITION CALCULATING METHOD IN MOBILE COMMUNICATION SYSTEM

BACKGROUND OF THE INVENTION

1. Field of the Invention

The present invention relates to a positioning system in a mobile communication system, and more particularly to a positioning system and a position calculating method in a mobile communication system for specifying a position of a mobile station on the basis of positional information from three base stations or on the basis of positional information initially from three base stations and subsequently from two base stations.

2. Description of the Related Art

At present, in a mobile communication system, there is a positioning system with a global positioning system (GPS) using an artificial satellite as a means for obtaining a position of a mobile station.

In a mobile communication system for the current personal digital cellular (PDC) or personal handy-phone system (PHS), there is a service for providing others with positional information by obtaining a position from a base station, but there is no system comprising a mobile station unit having a means for measuring its own position.

In a code division multiple access (CDMA) mobile communication system, however, there is a conventional technology in which a mobile station unit obtains its positional information on the basis of positional information from a base station.

This conventional technology is described in Positioning System" laid open as Unexamined Patent Publication (Kokai) No. 7-181242 on Jul. 21, 1995 (Applicant: Sony Corporation, Inventor: Takehiro Sugita).

This conventional technology is a CDMA digital mobile communication system in which a mobile equipment calculates a position of the mobile equipment with obtaining time differences at transmission of PN codes of four base stations by using coordinates of the four base stations and propagation time periods of signals to be transmitted.

In the conventional positioning system in the GPS, however, there is a problem that it requires a dedicated receiver and a dedicated antenna for receiving radio waves from an artificial satellite for a use of the GPS, which results in an expensive and large-sized apparatus.

In addition in the Positioning System" in the above Unexamined Patent Publication (Kokai) No. 7-181242, as described that Signals from at least three base stations need to be received in order to specify a location of the mobile station. The more the system has base stations from which signals can be received, the more an estimated precision is improved" in paragraph [0034] in the specification, the description is confined to the matter of specifying the position of the mobile equipment by obtaining the coordinates from the four base stations, but there is no description of a method for calculating the position of the mobile equipment by using only three base stations.

Therefore, the coordinates of the four base stations are used, which causes such problems that an infrastructure is heavy to calculate positional information of the mobile equipment and that a complicated calculation for evaluating the position increases a power consumption of the mobile equipment.

Furthermore, in the above Positioning System," there is a description only of a transmission to the base stations or an administrative station or of a transfer to others as for processing after specifying the position of the mobile equipment, without taking into consideration an effective use of the calculated positional information of the mobile equipment by an owner.

SUMMARY OF THE INVENTION

It is an object of the present invention to provide a positioning system and a position calculating method in a mobile communication system for specifying a position of a mobile station on the basis of positional information from three base stations or of positional information initially from three base stations and subsequently from two base stations and for effectively using the positional information with displaying map information on the mobile station on the basis of the specified positional information.

In accordance with a first aspect of the present invention, there is provided a positioning system in a mobile communication system comprising a stationary station unit and a mobile station unit, in which the stationary station,unit reports its positional information to the mobile station unit and in which the mobile station unit calculates differences in distance between the mobile station unit and three stationary station units on the basis of the positional information reported by the three stationary station units and phase differences between the measured stationary station units, measures a position of the mobile station unit on the basis of the reported positional information and the distances in distance, displays the information of the measured position, and reports information of the measured position to the stationary station units, and in which the stationary station units report corresponding map information to the mobile station unit on the basis of the reported positional information of the mobile station unit and further the mobile station unit displays the map information reported by the stationary station units, and therefore the position of the mobile station unit can be specified only with the positional information from the three stationary station units and further the specified position can be displayed on the mobile station unit by using the positional information and the map information, by which a system configuration can be simplified and the positional information of the mobile station unit be effectively used.

In accordance with a second aspect of the present invention, there is provided a position calculating method of a positioning system in a mobile communication system comprising a base station unit and a mobile station unit, the position calculating method comprising the steps of calculating differences between the mobile station unit and three base station units on the basis of positional information reported by the three base station units and phase differences between the measured base station units, setting an estimated distance between the mobile station unit and a first base station unit to an assumed value as initialization, making an assumption on distances between the mobile station unit and other base station units on the basis of the assumed distance, calculating an assumed position of the mobile station unit by using the assumed distances between the mobile station unit and the respective base station units and the positional information reported by the respective base station units, repeating the calculation with a feedback from a calculated distance to an assumed distance up to a sufficiently small difference between the calculated distance to the first base station unit obtained on the basis of the calculated assumed position and the assumed distance to the first base station unit, and determining an assumed position corresponding to the sufficiently small difference between the calculated distance and the assumed distance to be a position of the mobile station unit, by which the position can be precisely calculated in a simple logic and further the position calculation processing time be reduced by approximating the estimated distance set as initialization to an actual distance.

In accordance with a third aspect of the present invention, there is provided a positioning system in a mobile communication system comprising a stationary station unit and a mobile station unit, in which the stationary station unit reports its positional information to the mobile station unit, in which the mobile station unit calculates a position of the mobile station unit on the basis of the positional information of three stationary station units reported thereby and phase differences between the measured stationary station units and stores it as previous positional information, calculates differences in distance between the mobile station unit and two base station units on the basis of positional information of the two stationary station units reported thereby and phase differences between the stationary station units, calculates a position of the mobile station unit on the basis of the positional information of the stationary station units, the differences in distance, and the stored previous positional information of the mobile station unit, displays the information of the calculated position, and reports the information of the calculated position to the stationary station units, and in which the stationary station units report corresponding user information to the mobile station unit on the basis of the reported positional information of the mobile station unit and further the mobile station unit displays the user information reported by the stationary station units, and therefore the position of the mobile station unit can be specified initially with the positional information from the three stationary station units and subsequently only with the positional information from the two stationary station units and further the specified position can be displayed on the mobile station unit by using the positional information and the user information, by which a system configuration can be simplified, the position be continuously measured in an area in which there are only a few base stations, and further the positional information of the mobile station unit be effectively used.

DESCRIPTION OF REFERENCE NUMERALS

Figure 1:
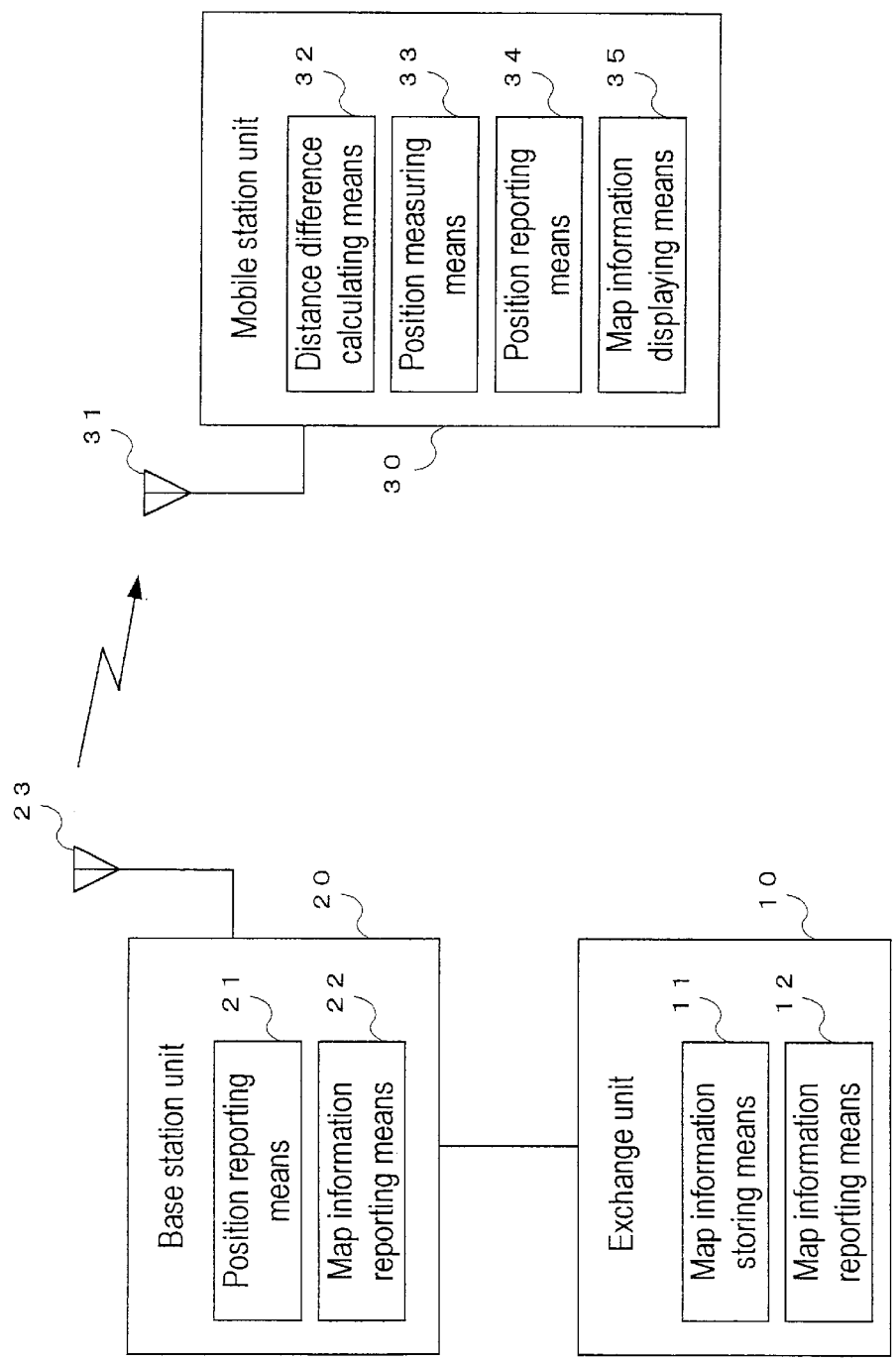
FIG. 1 is a function constitutional block diagram of a positioning system in a mobile communication system according to a first embodiment of the present invention.

10:Exchange unit, 11:Map information storing means, 12:Map information reporting means, 13:Map information storing section, 14:Exchange control section, 15:Circuit control section, 20:Base station unit, 21:Position reporting means, 22:Map information reporting means, 23:Antenna, 24:Circuit control section, 25:Control section, 26:Signal processing section, 27:Transmit-receive amplification section, 30:Mobile station unit, 31:Antenna, 32:Distance difference calculating means, 33:Position measuring means, 34:Position reporting means, 35:Map information displaying means, 36:Transmit-receive amplification section, 37:Signal processing section, 38:Control section, 39:Display section, 40:Storing section, 41:3-point position calculating means, 42:2-point position calculating means, 130:Mobile station unit, 138:Control section

DESCRIPTION OF THE PREFERRED EMBODIMENT

The present invention will be described below by using the accompanying drawings.

Means for executing functions described below may be any circuit or device only if it is capable of executing the corresponding functions, and it is also possible to execute a part or all of the functions using software. Furthermore, the means for executing the functions can be realized by a plurality of circuits and a plurality of means for executing functions can be realized by a single circuit.

A positioning system in a mobile communication system according to a first embodiment of the present invention is a positioning system in a mobile communication system comprising a stationary station unit including an exchange unit and a base station unit and a mobile station unit, in which the stationary station unit reports its positional information to the mobile station unit, in which the mobile station unit calculates differences in distance between the mobile station unit and three stationary station units on the basis of the positional information reported by the three stationary station units and phase differences between the measured stationary station units, measures a position of the mobile station unit on the basis of the reported positional information and the differences in distance, displays the information of the measured position, and reports the information of the measured position to the stationary station units, and in which the stationary station units report corresponding map information to the mobile station unit on the basis of the reported positional information of the mobile station unit and further the mobile station unit displays the map information reported by the stationary station units.

Accordingly the position of the mobile station unit can be specified only with the positional information from the three stationary station units and further the specified position can be displayed on the mobile station unit as positional information and be displayed by using the related map information, by which a system configuration can be simplified and the positional information of the mobile station unit be effectively used.

Figure 2:
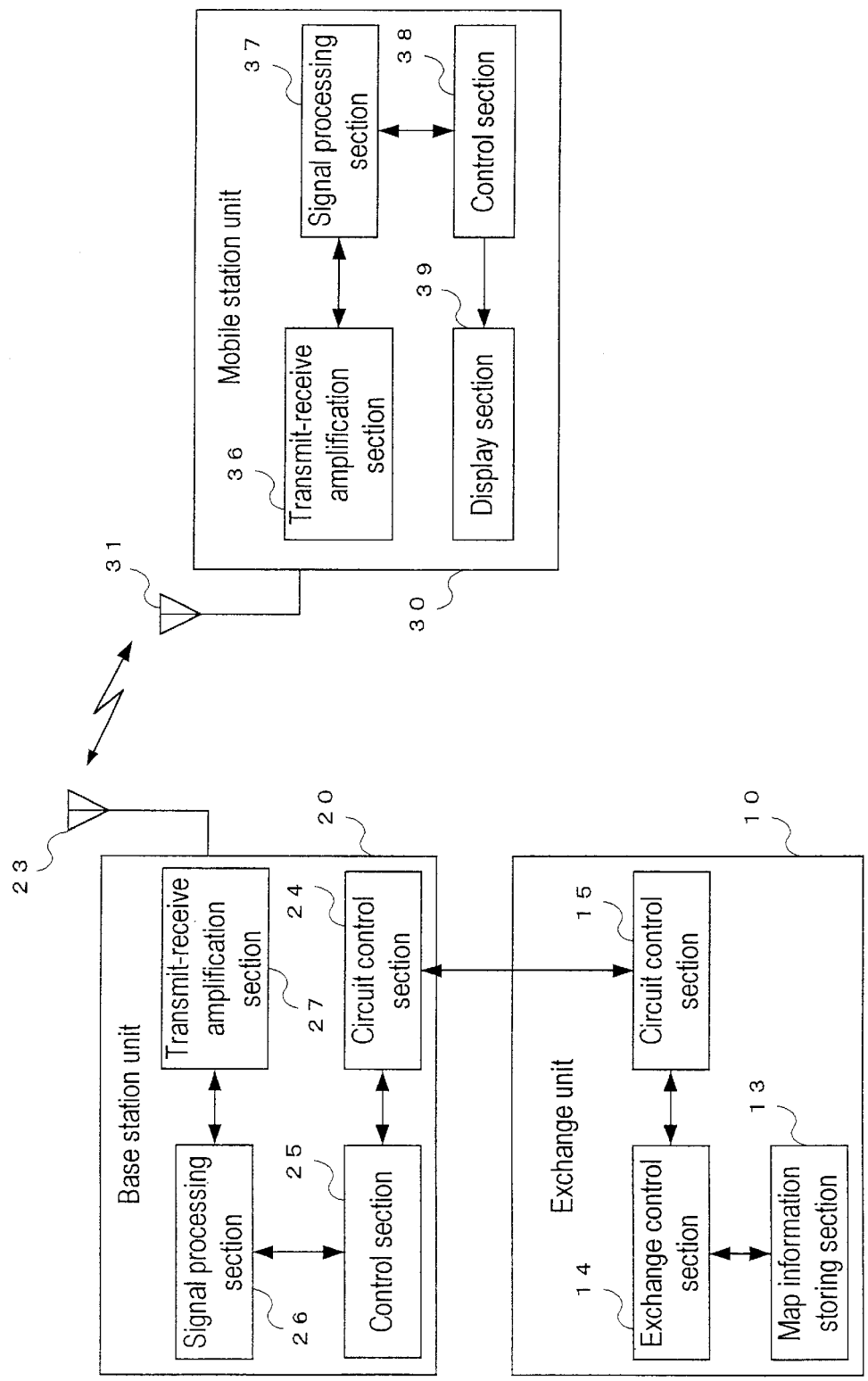
FIG. 2 is a constitutional block diagram of the positioning system in the mobile communication system according to the first embodiment of the present invention.

A description will be given below for the positioning system (a first positioning system) in the mobile communication system according to the first embodiment of the present invention by using FIGS. 1 and 2. Referring to FIG. 1, there is shown a function constitutional block diagram of the positioning system in the mobile communication system according to the first embodiment of the present invention. Referring to FIG. 2, there is shown a constitutional block diagram of the positioning system in the mobile communication system according to the first embodiment of the present invention.

As shown in FIG. 1, the first positioning system basically comprises an exchange unit 10, a base station unit 20, and a mobile station unit 30, the exchange unit 10 having a map information storing means 11 and a map information reporting means, the base station unit 20 having a position reporting means 21, a map information reporting means 22, and a transmit-receive antenna 23, and the mobile station unit 30 having a transmit-receive antenna 31, a distance difference calculating means 32, a position measuring means 33, a position reporting means 34, and a map information displaying means 35.

Although there is shown only a single base station unit 20 in FIG. 1, other two base station units are needed for the mobile station unit 30 to obtain its position.

The position reporting means 21 of the base station unit 20 is a means for reporting a position of the base station unit to the mobile station unit 30, the distance difference calculating means 32 of the mobile station unit 30 is a means for calculating a difference in distance between the mobile station unit and each base station unit 20, the position measuring means 33 is a means for measuring a position of the mobile station unit on the basis of the positions reported by arbitrary three base station units and differences in distance between the base station units, and the position reporting means 34 is a means for reporting a position of the mobile station unit measured by the mobile station unit 30 to devices in the side of the communication network such as the base station unit 20 or the exchange unit 10.

The map information storing means 11 of the exchange unit 10 is a means for storing the map information within a moving range of the mobile station unit 30 and the map information reporting means 12 is a means for obtaining surrounding map information from the map information storing means 11 on the basis of the positional information reported from the mobile station unit 30 and for reporting it to the mobile station unit 30 via the base station unit 20.

The map information reporting means 22 of the base station unit 20 is a means for reporting the map information reported by the exchange unit 10 to the mobile station unit 30 whose positional information is reported.

The map information displaying means 35 of the mobile station unit 30 is a means for displaying the map information reported by the base station unit 20.

Next, a concrete constitution for realizing the above means is described below by using FIG. 2.

As shown in FIG. 2, in a concrete constitution of the first positioning system, the exchange unit 10 comprises a map information storing section 13, an exchange control section 14, and a circuit control section 15, the base station unit 20 comprises an antenna 23, a circuit control section 24, a control section 25, a signal processing section 26, and a transmit-receive amplification section 27, and the mobile station unit 30 comprises an antenna 31, a transmit-receive amplification section 36, a signal processing section 37, a control section 38, and a displaying section 39.

The function executing means in FIG. 1 is compared with the constitution in FIG. 2 in the following description.

The map information storing means 11 is realized by the map information storing section 13 and the map information reporting means 12 is realized by the exchange control section 14 and the circuit control section 15.

The position reporting means 21 is realized by the control section 25, the signal processing section 26, and the transmit-receive amplification section 27 and the map information reporting means 22 is realized by the circuit control section 24, the control section 5, the signal processing section 26, and the transmit-receive amplification section 27.

The distance difference calculating means 32 is realized by the transmit-receive amplification section 36 and the signal processing section 37, the position measuring means 33 is by the control section 38, the position reporting means 34 is by the control section, the signal processing section 37, and the transmit-receive amplification section 36, and the position information displaying means 35 is by the control section 38 and the displaying section 39.

Figure 3:
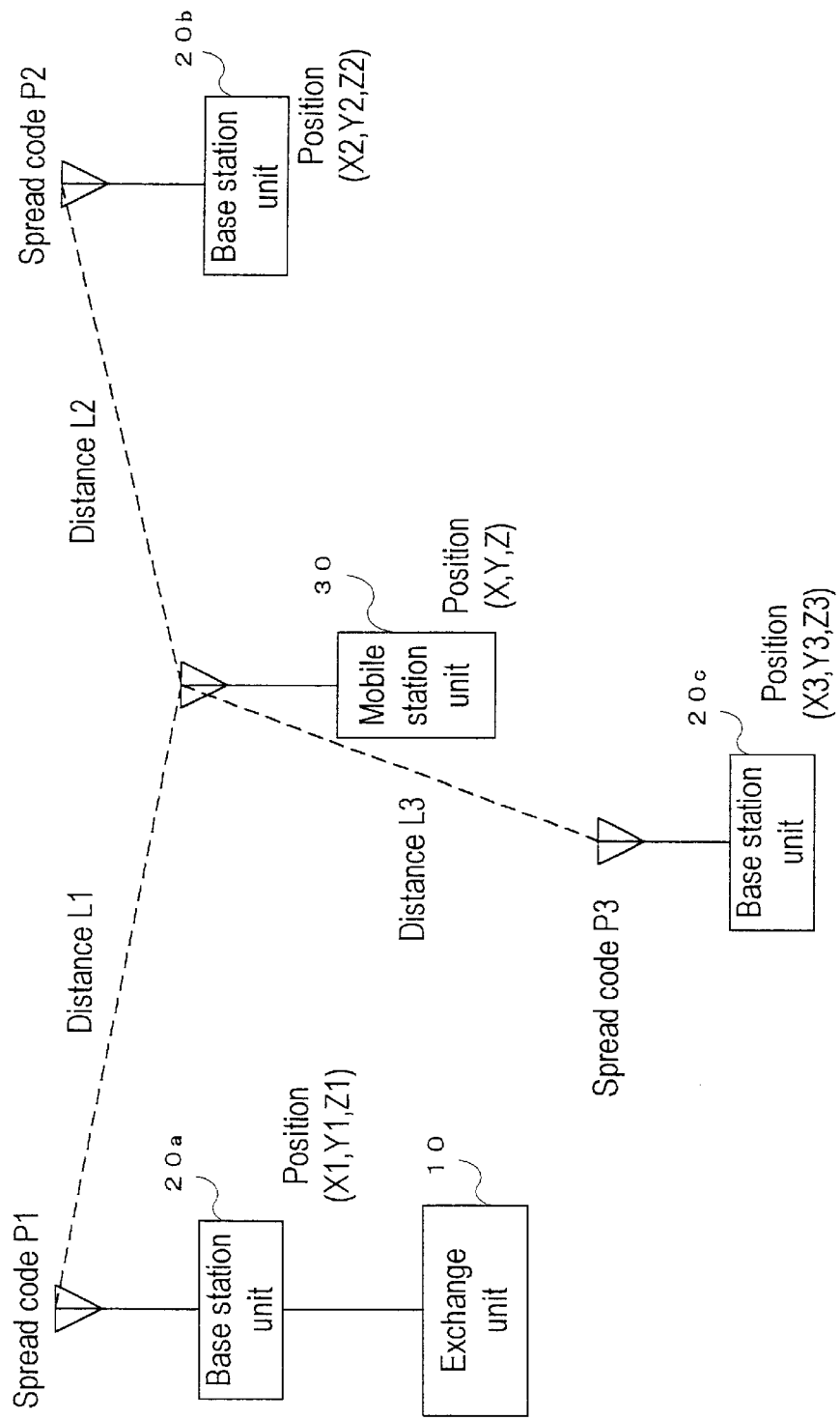
FIG. 3 is a schematic diagram of assistance in explaining processing of the positioning system in the mobile communication system according to the first embodiment of the present invention.

Next, processing operations in the first positioning system will be described below by using FIGS. 2 and 3. Referring to FIG. 3, there is shown a schematic diagram of assistance in explaining the processing of the positioning system in the mobile communication system according to the first embodiment of the present invention.

In the base station unit 20a, the base station unit 20b, and the base station unit 20c, the positional information representing their own positions (X1, Y1, Z1), (X2, Y2, Z2), and (X3, Y3, Z3) are transmitted from the control section 25 to the signal processing section 26, where the information is modulated by using a spread code p1, p2, or p3 which is a pseudo random number sequence and then it is transmitted from the transmit-receive amplification section 27 to the mobile station unit 30 via the antenna 23 by means of radio waves.

The positional information, however, is represented in a three-dimensional orthogonal coordinate system such as three-dimensional coordinates in the Japan geodesic system.

The positional information is always transmitted using a broadcast control channel, for example.

In addition the spread code start timing for p1, p2, and p3 shall be the same. Even if the transmission timing is different from each other among respective base station units in the system, an offset value of the difference is transmitted from each base station unit to a broadcast control channel or the like and therefore it becomes possible to perform the same operation as for the present invention by correcting the offset value.

The mobile station unit 30 receives the radio waves transmitted from the antenna 31 by the base station unit 20 and then the signal is transmitted from the transmit-receive amplification section 36 to the signal processing section 37.

In the signal processing section 37, the spread code p1, p2, or p3 is used for a synchronization with the signal and modulation of the signal to measure a phase difference d1 between the base station unit 20a and the base station unit 20b, a phase difference d2 between the base station unit 20a and the base station unit 20c, and a phase difference d3 between the base station unit 20b and the base station unit 20c.

Subsequently, the phase differences measured and the signals modulated in the signal processing section 37, in other words, positional information (X1, Y1, Z1), (X2, Y2, Z2), (X3, Y3, Z3) of the respective base station units 20 are transmitted to the control section 38.

Figure 4:
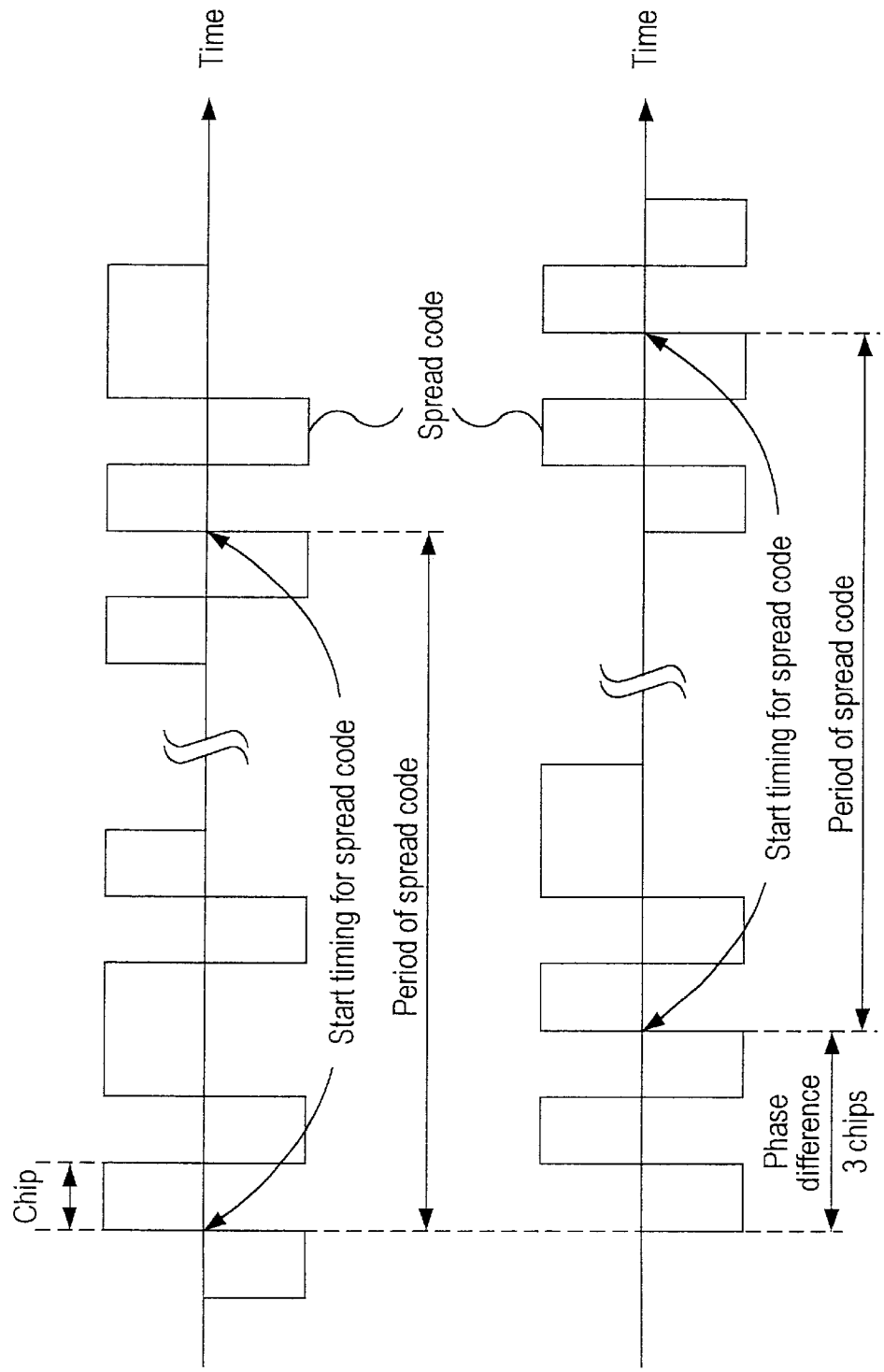
FIG. 4 is a timing diagram showing a phase difference, spread code start timings, a spread code period, and spread code chip in a CDMA mobile communication system according to the first embodiment of the present invention.

It should be noted in the above that the phase difference is a difference in start timing of the spread codes represented by the number of chips as shown in FIG. 4, and the synchronization, the signal modulation, and the phase difference measurement are executed in generally known methods. Referring to FIG. 4, there is shown a timing diagram illustrating a phase difference, a spread code start timing, a spread code period, and a chip of a spread code in a CDMA mobile communication system according to the embodiment of the present invention.

It should be noted that a distance Li (i=1, 2, 3) between the mobile station unit 30 and the three base station units 20a, 20b, and 20c is assumed to be shorter than a half of a radio wave propagation distance for a period of a spread code.

Supposing that t (time) denotes a period of the spread code and V denotes a radio wave propagation speed, these conditions are expressed by the following equation:
[Eq. 1]

$$L_i < V_t/2 \qquad (1)$$

The control section 38 of the mobile station unit 30 calculates a distance between the mobile station unit 30 and each base station unit 20 on the basis of the phase difference d1, d2, or d3 between respective base station units 20 transmitted by the signal processing section 37, calculates a position (x, y, z) of the mobile station unit on the basis of the differences in distance and the obtained positional information of the base station units (X1, Y1, Z1), (X2, Y2, Z2), (X3, Y3, Z3), and transmits the calculated position (x, y, z) to the displaying section 39 and the signal processing section 37.

A method of realizing a means for calculating the differences in distance between the mobile station unit 30 and the respective base station units 20 and a method of realizing a means for calculating the position of the mobile station unit 30 will be described later concretely.

The displaying section 39 of the mobile station unit 30 displays the position (x, y, z) of the mobile station unit 39 transmitted from the control section 38.

Next, the control section 38 of the mobile station unit 30 follows a procedure of a call connection for the base station unit 20 and the exchange unit 10.

In an example of FIG. 3, a call connection procedure is executed for the base station unit 20a and the exchange unit 10.

It should be noted that the call connection procedure is executed in a generally used method.

After the call connection, the control section 38 of the mobile station unit 30 transmits information of its own measured position (x, y, z) to the signal processing section 37, where the information is modulated by using the spread code p1 and then it is transmitted from the transmit-receive amplification section 36 to the base station unit 20a via the antenna 31 by means of radio waves.

The control section 25 of the base station unit 20a receives the information of the position (x, y, z) of the mobile station unit 30 after passing through demodulation of the signal with the spread code p1 in the antenna 23, the transmit-receive amplification section 27, and the signal processing section 26 and then transmits the information to the exchange unit 10 via the circuit control section 24.

The exchange control section 14 of the exchange unit 10 receives the information of the position (x, y, z) of the mobile station unit 30 from the circuit control section 15 and obtains map information such as a map, an address, and main facilities in surroundings of the position (x, y, z) of the mobile station unit 30, from the map information storing section 13.

Subsequently the exchange control section 14 of the exchange unit 10 transmits the map information such as the map, the address, and the main facilities in the surroundings of the position (x, y, z) of the mobile station unit 30 obtained from the map information storing section 13 to the base station unit 20a via the circuit control section 15.

The control section 25 of the base station unit 20a receives the map information such as the map, the address, and the main facilities in the surroundings of the position (x, y, z) of the mobile station unit 30 from the circuit control section 24 and then transmits the map information from the transmit-receive amplification section 27 and the antenna 23 to the mobile station unit 30, passing through modulation with the spread code p1 in the signal processing section 26.

The control section 38 of the mobile station unit 30 obtains the map information such as the map, the address, and the main facilities in the surroundings of the position (x, y, z) of the mobile station unit 30 transmitted by the base station unit 20a after the demodulation with the spread code p1 in the antenna 31, the transmit-receive amplification section 36, and the signal processing section 37 and then transmits the map information to the displaying section 39.

The displaying section 39 of the mobile station unit 30 displays the map information such as the map, the address, and the main facilities in the surroundings of the position (x, y, z) of the mobile station unit 30 transmitted from the control section 38.

As set forth in the above, a user of the mobile station unit 30 can grasp his or her own position (x, y, z) and the map information such as the map, the address, and the main facilities in the surroundings.

Next, a description will be given below for methods of realizing the means for calculating the differences in distance between the mobile station unit 30 and respective base station units on the basis of the phase difference d1, d2, or d3 between the measured base station units and the means for measuring the position (x, y, z) of the mobile station unit on the basis of the differences in distance and the positional information (X1, Y1, Z1), (X2, Y2, Z2), and (X3, Y3, Z3) of the base station units in the control section 38 of the mobile station unit 30.

Regarding distances L1, L2, and L3 between the mobile station unit 30 and the base station unit 20a, the base station unit 20b, and the base station unit 20c, the differences in distance L1−L2, L1−L3, and L2−L3 between the mobile station unit 30 and the base station units 20 are expressed on the basis of the phase differences d1, d2, and d3 by the following equations, where V denotes the radio wave propagation speed and R denotes the number of chips per unit time of the spread code:
[Eq. 2]

$$L_1 - L_2 = V \times d_1 / R \qquad (2)\text{-}1$$

$$L_1 - L_3 = V \times d_2 / R \qquad (2)\text{-}2$$

$$L_2 - L_3 = V \times d_3 / R \qquad (2)\text{-}3$$

In addition, to calculate the position (x, y, z) of the mobile station unit 30, x', y', and z' are obtained so that dx, dy, and dz are the minimum in an equation [Eq. 3] in the control section 38 on the basis of the differences in distance between the mobile station unit 30 and the base station units 20 obtained by the above equation.

The x', y', and z' in the above are coordinates x, y, z of the mobile station unit 30.

[Eq. 3]

$$A\Delta = F \quad (3)$$

$$A = \begin{pmatrix} (a_1 - a_2) & (b_1 - b_2) & (c_1 - c_2) \\ (a_1 - a_3) & (b_1 - b_3) & (c_1 - c_3) \\ (a_2 - a_3) & (b_2 - b_3) & (c_2 - c_3) \end{pmatrix},$$

$$\Delta = \begin{pmatrix} dx \\ dy \\ dz \end{pmatrix}$$

$$F = \begin{pmatrix} V \times d_1/R - S_1 + S_2 \\ V \times d_2/R - S_1 + S_3 \\ V \times d_3/R - S_2 + S_3 \end{pmatrix}$$

For example, supposing that an error in a height direction, that is, z correction value dz is zero (dz=0), initial values of the x', y', and z' are assumed to be average values of the positions of the base station units, in other words, x'=(X1+X2+X3)/3, y'=(Y1+Y2+Y3)/3, and z'=(Z1+Z2+Z3)/3 to obtain dx and dy from the conditional expression $A\Delta=F$.

Subsequently the dx and dy are substituted into an equation [Eq. 4] to obtain x and y and then they are assumed to be x' and y' to obtain dx and dy from the conditional expression $A\Delta=F$ again.

[Eq. 4]

$$x=x'+dx \quad (4)\text{-}1$$

$$y=y'+dy \quad (4)\text{-}2$$

$$z=z'+dz \quad (4)\text{-}3$$

This calculation is repeated up to absolute values |dx| and |dy| of the dx and dy smaller than 1.

The x' and y' at this point are x and y coordinates of the position of the mobile station unit 30.

The z coordinate of the position of the mobile station unit 30 is (Z1+Z2+Z3)/3.

The equations [Eq. 3], [Eq. 4], [Eq. 5], and [Eq. 6] are derived in generally used methods.

[Eq. 5]

$$a_i = -\frac{X_i - x'}{S'_i} \quad (5)\text{-}1$$

$$b_i = -\frac{Y_i - y'}{S'_i} \quad (5)\text{-}2$$

$$c_i = -\frac{Z_i - z'}{S'_i} \quad (5)\text{-}3$$

[Eq. 6]

$$S'_i = \{(X_i-x')^2+(Y_i-y')^2+(Z_i-z')^2\}^{1/2} \quad (6)$$

(i=1, 2, 3)

A description will be given below for deriving processes of the above equations [Eq. 3], [Eq. 4], [Eq. 5], and [Eq. 6].

Supposing that the differences in distance satisfy the relations D1=L1−L2, D2=L1−L3, and D3=L2−L3 regarding the distances L1, L2, and L3 between the mobile station unit 30 and the base station units 20a, 20b, and 20c, D1, D2, and D3 can be expressed by using measured values (phase differences) d1, d2, and d3 and residuals v1, v2, and v3 given by measurement errors of the measured values d1, d2, and d3 as follows:

$$D1=L1-L2=V\times d1/R+v1 \quad [1]$$

$$D2=L1-L3=V\times d2/R+v2 \quad [2]$$

$$D3=L2-L3=V\times d3/R+v3 \quad [3]$$

where V denotes the radio wave propagation speed and R denotes the number of chips per unit time of the spread code.

Supposing that the position of the mobile station unit 30 is (x, y, z), D1, D2, and D3 can also be expressed as follows:

$$D1 = L1 - L2 = \{(X1-x)^2 + (Y1-y)^2 + (Z1-z)^2\}^{1/2} - \{(X2-x)^2 + (Y2-y)^2 + (Z2-z)^2\}^{1/2} \quad [4]$$

$$D2 = L1 - L3 = \{(X1-x)^2 + (Y1-y)^2 + (Z1-z)^2\}^{1/2} - \{(X3-x)^2 + (Y3-y)^2 + (Z3-z)^2\}^{1/2} \quad [5]$$

$$D3 = L2 - L3 = \{(X2-x)^2 + (Y2-y)^2 + (Z2-z)^2\}^{1/2} - \{(X3-x)^2 + (Y3-y)^2 + (Z3-z)^2\}^{1/2} \quad [6]$$

At this point the x, y, and z values are expressed by using the assumed values x', y', and z' and their corrected values dx, dy, and dz as follows:

$$x=x'+dx \quad [7]$$

$$y=y'+dy \quad [8]$$

$$z=z'+dz \quad [9]$$

Then, substituting equations [7], [8], and [9] into equations [4], [5], and [6] and assuming that dx, dy, and dz are sufficiently low relative to x, y, and z, we have the following linearization by using a Taylor expansion:

$$D1=S1-S2+a1\cdot dx+b1\cdot dy+c1\cdot dz-(a2\cdot dx+b2\cdot dy+c2\cdot dz) \quad [10]$$

$$D2=S1-S3+a1\cdot dx+b1\cdot dy+c1\cdot dz-(a3\cdot dx+b3\cdot dy+c3\cdot dz) \quad [11]$$

$$D3=S2-S3+a2\cdot dx+b2\cdot dy+c2\cdot dz-(a3\cdot dx+b3\cdot dy+c3\cdot dz) \quad [12]$$

where ai, bi, ci (i=1, 2, 3) and Si (i=1, 2, 3) are expressed by $$ai=-(Xi-x')/S'i \quad [13]$$

$$bi=-(Yi-y')/S'i \quad [14]$$

$$ci=-(Zi-z')/S'i \quad [15]$$

The following observation equations are derived from the above equations [1], [2], [3] and [10], [11], [12]:

$$v1=(a1-a2)dx+(b1-b2)dy+(c1-c2)dz+S1-S2-V\times d1/R \quad [17]$$

$$v2=(a1-a3)dx+(b1-b3)dy+(c1-c3)dz+S1-S3-V\times d2/R \quad [18]$$

$$v3=(a2-a3)dx+(b2-b3)dy+(c2-c3)dz+S2-S3-V\times d3/R \quad [19]$$

where [17], [18], and [19] are expressed by using the following matrix:

[Eq. 7]

$$V = \begin{pmatrix} V_1 \\ V_2 \\ V_3 \end{pmatrix},$$

$$A = \begin{pmatrix} (a_1-a_2) & (b_1-b_2) & (c_1-c_2) \\ (a_1-a_3) & (b_1-b_3) & (c_1-c_3) \\ (a_2-a_3) & (b_2-b_3) & (c_2-c_3) \end{pmatrix},$$

$$\Delta = \begin{pmatrix} dx \\ dy \\ dz \end{pmatrix}$$

$$F = \begin{pmatrix} V \times d_1/R - S_1 + S_2 \\ V \times d_2/R - S_1 + S_3 \\ V \times d_3/R - S_2 + S_3 \end{pmatrix}$$

$$v = A\Delta - F \quad [20]$$

If v=0, equation [20] can be expressed by $$A\Delta = F \quad [21]$$

Therefore, the control section 38 of the mobile station unit 30 is capable of calculating its own position (x, y, z) by evaluating dx, dy, and dz from the equation [21] and substituting them into equations [7], [8], and [9].

Figure 5:
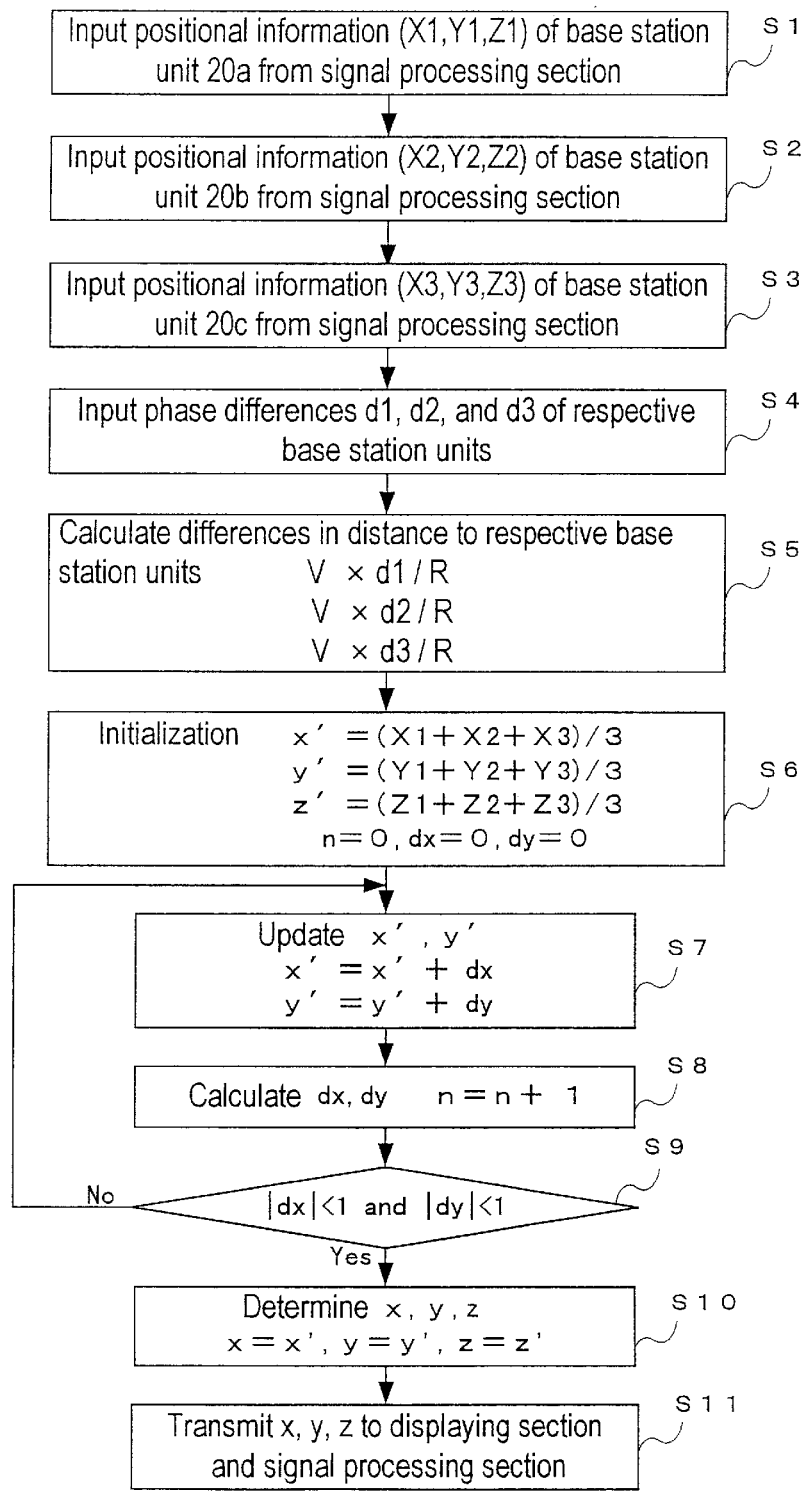
FIG. 5 is a flowchart showing processing in a control section of a mobile station unit in the positioning system according to the first embodiment of the present invention.

Next, a processing flow in the control section 38 of the mobile station unit 30 is described below by using FIG. 5. Referring to FIG. 5, there is shown a flowchart of processing in the control section of the mobile station unit.

The control section 38 inputs the positional information (X1, Y1, Z1), (X2, Y2, Z2), and (X3, Y3, Z3) of the base station units 20 from the signal processing section 37 (S1 to S3) and phase differences d1, d2, and d3 between the base station units 20 (S4).

Next, it calculates the differences D1, D2, and D3 in distance between the mobile station unit 30 and the base station units 20 (S5). Their calculating methods are as follows:

$$D1 = L1 - L2 = V \times d1/R$$

$$D2 = L1 - L3 = V \times d2/R$$

$$D3 = L2 - L3 = V \times d3/R$$

Furthermore, assumed values x', y', and z' are calculated as initialization by the following expressions:

$$x' = (X1 + X2 + X3)/3$$

$$y' = (Y1 + Y2 + Y3)/3$$

$$z' = (Z1 + Z2 + Z3)/3$$

where the counter value n, the corrected value dx for x, and the corrected value dy for y shall be set to 0 (S6).

Next, x' and y' update processing is performed (S7). The updating expressions are as follows:

$$x' = x' + dx$$

$$y' = y' + dy$$

It should be noted that the initial values dx and dy are both 0 (dx=0, dy=0) in the first calculation and therefore x' and y' calculated in the process S6 are adopted directly.

Next, dx and dy are calculated by using the conventional expression $A\Delta = F$ of [Eq. 3] and the counter value n is incremented by 1 (S8).

Then, it is determined that the dx absolute value |dx|<1 and the dy absolute value |dy|<1 (S9); unless |dx|<1 and |dy|<1 (No), the control returns to the process S7. In the process S7, x' and y' are updated by using the calculated dx and dy, and further in the process S8, dx and dy are calculated by the conventional expression $A\Delta = F$.

If the judgment result of the process S9 is |dx|<1 and |dy|<1 (Yes), the control progresses to process S10.

In the process S10, x, y, and z are determined supposing x=x', y=y', and z=z', where z is obtained by z=(Z1+Z2+Z3)/3.

Then x, y, and z are output to the displaying section 39 and output to the signal processing section 37 (S11).

In this manner, the control section 38 executes a position calculation of the mobile station unit 30.

The first positioning system is applied to a CDMA mobile communication system. By using this positioning system a user of the mobile station unit 30 can grasp map information such as his or her own current position, a map of the surroundings, its address, and main facilities without using a GPS requiring a dedicated receiver or antenna.

According to the first positioning system, the position of the mobile station unit 30 is specified only with the positional information from three base station units 20a, 20b, and 20c, the specified position is displayed as coordinates on the displaying section 39 of the mobile station unit 30, and related map information stored in the exchange unit 10 is received on the basis of the positional information and displayed on the displaying section 39, by which the system configuration can be simplified and the positional information of the mobile station units be effectively used by obtaining the map or the like.

Figure 6:
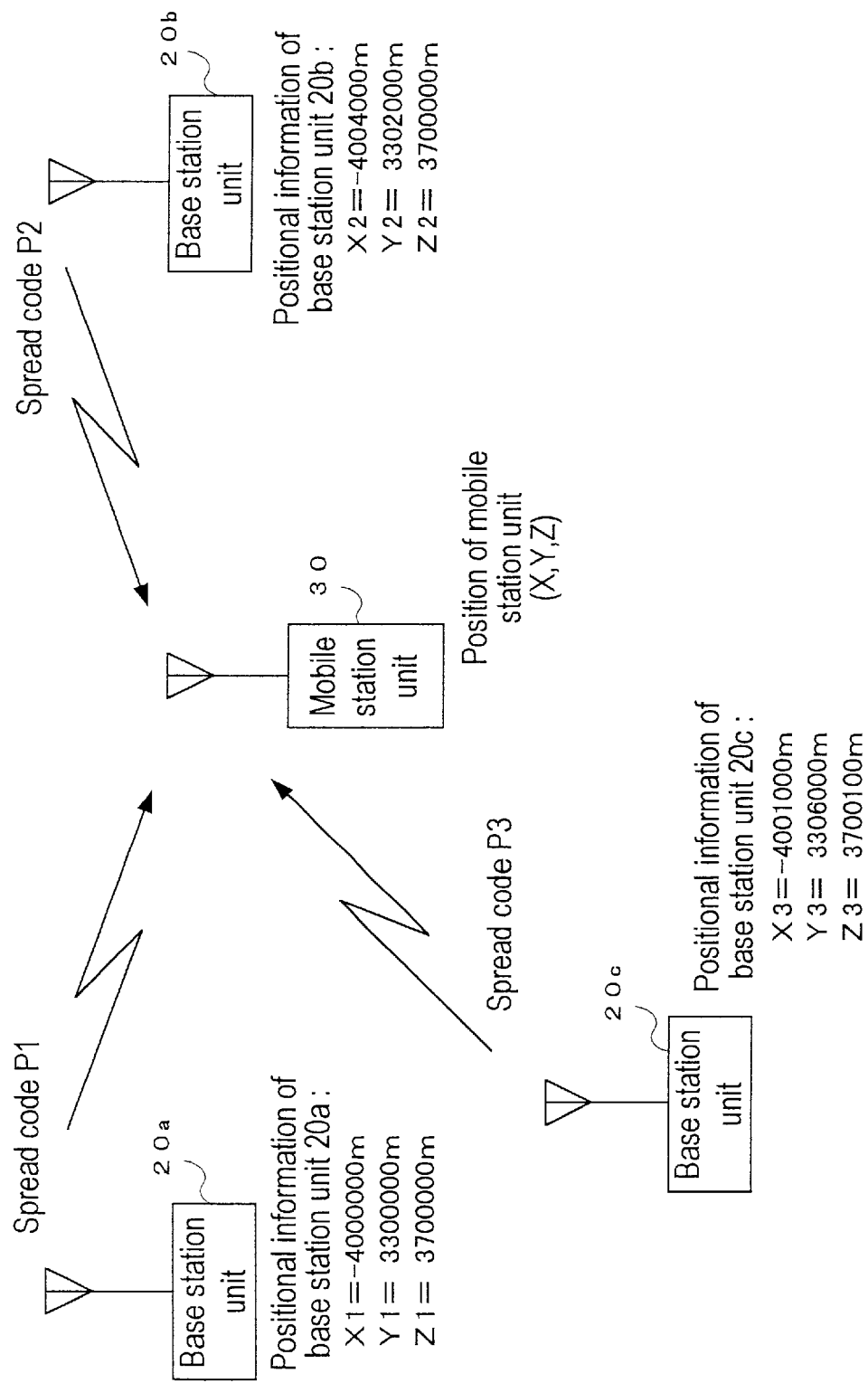
FIG. 6 is a schematic diagram of assistance in explaining an example to which the first embodiment of the present invention is applied.

By referring to the first embodiment of the present invention, a concrete example will be given below to explain how the mobile station unit 30 measures its own position on the basis of the differences in distance between the mobile station unit and arbitrary three base station units 20a, 20b, and 20c and positional information reported by these base station units 20a, 20b, and 20c by using FIG. 6. Referring to FIG. 6, there is shown a schematic diagram of assistance in explaining the first embodiment of the present invention.

In FIG. 6, the base station units 20a, 20b, and 20c modulates the positional information in three-dimensional coordinates of the Japan geodesic system (X1=-4000000 m, Y1=3300000 m, Z1=3700000 m), (X2=-4004000 m, Y2=3302000 m, Z2=3700000 m), (X3=-4001000 m, Y3=3306000 m, Z3=3700100 m) by using spread codes p1, p2, and p3, respectively, and always transmitted by using broadcast control channels. It should be noted that the spread code start timing is the same.

The number of chips R per unit time of the spread code p1, p2, or p3 is 3.84 Mcps or 4.096 Mcps, which is a system-specific value. The period t is 10 ms. The radio wave propagation speed V is assumed to be 299792458 m/s.

In this condition, the distance between the mobile station unit and each base station unit is assumed to be shorter than V t/2=1498962 m on the basis of the condition of the inequality [Eq. 1].

In the signal processing section 37 of the mobile station unit 30, it is assumed that the phase difference d1 between the base station unit 20a and the base station unit 20b, the phase difference d2 between the base station unit 20a and the base station unit 20c, and the phase difference between the base station unit 20b and the base station unit 20c are measured as follows, respectively:

d1=38, d2=30, d3=8

The control section 38 calculates its own position (x, y, z) as described below in the above condition.

The assumed values x', y', and z' of x, y, and z are supposed to be x'=−4001667, y'=3302667, and z'=3700033, respectively, on the basis of the average values of the coordinates of the three base station units 20a, 20b, and 20c.

Then x', y', and z' are substituted into equation [Eq. 8].

[Eq. 8]

$$\begin{pmatrix} -1.491 & 0.573 & -0.0031 \\ -0.334 & 1.828 & 0.0302 \\ 1.157 & 1.255 & 0.0333 \end{pmatrix} \begin{pmatrix} dx \\ dy \\ dz \end{pmatrix} = \begin{pmatrix} 2062 \\ 2450 \\ 1558 \end{pmatrix} \quad (8)$$

Next, dz=0 is substituted into equation [Eq. 8].

[Eq. 9]

$$\begin{pmatrix} -1.491 & 0.573 \\ -0.334 & 1.828 \end{pmatrix} \begin{pmatrix} dx \\ dy \end{pmatrix} = \begin{pmatrix} 2062 \\ 2450 \end{pmatrix} \quad (9)$$

dx and dy are obtained from equation [Eq. 9].

$dx = -933, dy = 1170$ dx and dy are substituted into equations (4)-1, (4)-2, and (4)-3 of equation [Eq. 4] to obtain x and y.

$x = -4002600, y = 3303837$ x and y are supposed to be x' and y' and then substituted into conditional expression [Eq. 3] to obtain dx and dy.

Then the calculations of [Eq. 4] and [Eq. 3] are repeated up to |dx| and |dy| smaller than 1.

[Table 1] shows values of x', y' and dx, dy obtained by the calculations in the above procedure.

TABLE 1

Calculation result of x', y' and dx, dy

| Iteration count | x' | y' | dx | dy |
|---|---|---|---|---|
| 1 | −4001667 | 3302667 | −933 | 1170 |
| 2 | −4002600 | 3303837 | −385 | 162 |
| 3 | −4002985 | 3303999 | −32 | 18 |
| 4 | −4003017 | 3304017 | −0.3 | 0.2 |

Therefore the position of the mobile station unit 30 to be obtained is as follows:

$x = -4003017 \text{ m}$ $y = 3304017 \text{ m}$ $z = 3700033 \text{ m}$

According to the first embodiment of the present invention, the position of the mobile station unit 30 can be calculated in a simple method by using the positional information from three base station units 20a, 20b, and 20c, by which it becomes possible to realize an infrastructure of a communication network at a low cost advantageously.

Next, a second embodiment of the present invention will be described below by referring to the accompanying drawings.

A calculating method of a positioning system in a mobile communication system according to a second embodiment of the present invention comprises the steps of calculating differences in distance between a mobile station unit and respective base station units on the basis of positional information reported by three base station units and measured phase differences between the base station units, setting an estimated distance between the mobile station unit and a first base station unit to an assumed distance as initialization, making an assumption on distances between the mobile station unit and other base station units on the basis of the assumed distance, calculating an assumed position of the mobile station unit by using the assumed distances between the mobile station unit and the respective base station units and the positional information reported by the respective base station units, repeating the calculation with a feedback from a calculated distance to an assumed distance up to a sufficiently small difference between the calculated distance to the first base station unit obtained on the basis of the calculated assumed position and the assumed distance to the first base station unit, and determining an assumed position corresponding to the sufficiently small difference between the calculated distance and the assumed distance to be a position of the mobile station unit, by which the position can be precisely calculated in a simple logic and further position calculation processing time be reduced by approximating the estimated distance as initialization to an actual distance.

The positioning system (a second positioning system) in the mobile communication system according to the second embodiment of the present invention has completely the same configuration as for the positioning system according to the first embodiment as shown in FIGS. 1 and 2, and therefore its description will be omitted here.

The second positioning system, however, differs from the positioning system according to the first embodiment in that a control section 38 of a mobile station unit 30 of the positioning system according to the second embodiment calculates differences in distance between the mobile station unit 30 and respective base station units 20 on the basis of a phase difference d1, d2, or d3 between respective base station units 20 transmitted from a signal processing section 37, calculates its own position (x, y) on the basis of the differences in distance and the obtained positional information (X1, Y1, Z1), (X2, Y2, Z2), and (X3, Y3, Z3) of the base station units, and then transmits the calculated position (x, y) to a displaying section 39 and a signal processing section 37.

At this point, the mobile station unit 30 of the positioning system according to the second embodiment is characterized in that it is permitted to ignore a difference in a height direction at the position of each base station unit or a difference caused by a curvature on the surface of the earth, that is, a difference in component z in the calculation of its own position and that the position of the mobile station unit 30 is obtained as (x, y) in a two-dimensional orthogonal coordinate system so that subsequently the position of the mobile station unit 30 is treated two-dimensionally in the mobile station unit 30, being compared with the positioning system according to the first embodiment in which the position is three-dimensionally obtained and treated.

Next, in the control section 38 of the mobile station unit 30, a description will be given below for methods of realizing a means for calculating differences in distance between the mobile station unit 30 and respective base station units on the basis of phase differences d1, d2, or d3 between the measured base station units and a means for measuring a position (x, y) of the mobile station unit on the basis of the differences in distance and positional information (X1, Y1, Z1), (X2, Y2, Z2), and (X3, Y3, Z3) of the base station units.

In this method, it is assumed that the difference in a height direction at a position of each base station unit 20 and the difference caused by a curvature on the surface of the earth, that is, a difference in component z can be ignored and the position of the mobile station unit 30 is obtained as (x, y) in the two-dimensional orthogonal coordinate system.

Regarding distances L1, L2, and L3 between the mobile station unit 30 and a base station unit 20a, a base station unit 20b, and a base station unit 20c, differences L1–L2, L1–L3, and L2–L3 in distance between the mobile station unit 30 and the base station units 20 can be calculated by the following equations on the basis of phase differences d1, d2, and d3, where V is the radio wave propagation speed and R is the number of chips per unit time of a spread code:
[Eq. 10]

$$L_1 - L_2 = V \times d_1 / R$$

$$L_1 - L_3 = V \times d_2 / R$$

$$L_2 - L_3 = V \times d_3 / R$$

Then L1, L2, and L3 can be estimated as shown by [Eq. 11] on the basis of the relations of (L1–L2) and (L1–L3) in [Eq. 10].
[Eq. 11]

$$L_1 = 1$$

$$L_2 = 1 - V \times d_1 / R$$

$$L_3 = 1 - V \times d_2 / R$$

where, in [Eq. 11], 1 denotes an estimated value of L1 and it does not affect a precision of this measurement. Therefore, an appropriate fixed value is applicable to 1.

In addition, L1, L2, and L3 can also be expressed by [Eq. 12] on the basis of values (X1, Y1), (X2, Y2), and (X3, Y3) in the two-dimensional orthogonal coordinate system of the positional information of the base station units 20a, 20b, and 20c and of the position (x, y) of the mobile station unit 30.
[Eq. 12]

$$\begin{cases} \{(X_1 - x)^2 + (Y_1 - y)^2\}^{1/2} = L_1 \\ \{(X_2 - x)^2 + (Y_2 - y)^2\}^{1/2} = L_2 \\ \{(X_3 - x)^2 + (Y_3 - y)^2\}^{1/2} = L_3 \end{cases}$$

Then x, y can be expressed by [Eq. 13] on the basis of the above [Eq. 12].
[Eq. 13]

$$\begin{pmatrix} (X_1 - X_2)(Y_1 - Y_2) \\ (X_1 - X_3)(Y_1 - Y_3) \end{pmatrix} \begin{pmatrix} x \\ y \end{pmatrix} = \begin{pmatrix} \frac{(X_1^2 + Y_1^2) - (X_2^2 + Y_2^2) - (L_1^2 - L_2^2)}{2} \\ \frac{(X_1^2 + Y_1^2) - (X_3^2 + Y_3^2) - (L_1^2 - L_3^2)}{2} \end{pmatrix}$$

Therefore, in the mobile station unit 30, the differences in distance L1–L2 and L1–L3 are previously obtained by using [Eq. 10] on the basis of the radio wave propagation speed V, the number of chips R per unit time of a spread code, and the phase difference d1, d2, or d3, the estimated value 1 of the distance L1 between the mobile station unit 30 and the base station unit 20a is used to obtain the assumed L2 and L3 by using [Eq. 11], an assumed position (x, y) of the mobile station unit 20 is obtained by using [Eq. 13] on the basis of the two-dimensional orthogonal coordinate system values (X1, Y1), (X2, Y2), and (X3, Y3) of the positional information reported by the base station units 20a, 20b, and 20c and of the assumed distances L1, L2, and L3 obtained by using the estimated value 1, and the obtained x and y are used to calculate L1 by using [Eq. 12] so as to consider it to be a calculated distance L1'.

This calculated distance L1' is calculated from the assumed position (x, y) obtained based on the estimated value 1. Therefore, if an absolute value of a difference between the estimated value 1 and the calculated distance L1' is greater than a required value, the obtained calculated distance L1' is considered to be an assumed distance L1 to repeat the above processing, and it is repeated until a smaller value than the required one is obtained as an absolute value of a difference between the assumed distance L1 and the calculated distance L1' calculated from the assumed position (x, y) which has been obtained on the basis of the assumed distance L1. The position (x, y) at the absolute value smaller than the required one becomes a position of the mobile station unit 30.

While the above-described estimated value 1 can be an appropriate fixed value, the more the estimated value 1 is approximated to the distance L1 between the actual mobile station unit 30 and the base station unit 20a, the less number of iterative calculations is required for decreasing the difference between the estimated L1 and the calculation result L1'. Therefore, to reduce the calculation time for measuring its own position in the mobile station unit 20, it is desired to be permitted to set an estimated value 1 close to the actual distance L1 between the mobile station unit 30 and the base station unit 20a.

Therefore, as a method of obtaining a precise estimated value, there is a method in which a propagation loss is measured, a distance between the mobile station unit 30 and the base station unit 20a is calculated from the measured propagation loss, and the calculated distance is used as an estimated value.

It is generally known that a relationship between a distance between a base station and a mobile station and a propagation loss can be obtained by using an approximate expression as shown in the following [Eq. 14], for example. The following expression [Eq. 14] refers to the Okumura curve described on page 11 in Chapter 2.1.3 in a publication titled Plain Digital Communication" by Ryoichi Tanaka (Electronic Communication Society Publication).
[Eq. 14]

$$\begin{cases} R_b = 69.55 + 26.16 \; \log f - 13.82 \; \log h_1 - a(h_2) + \\ (44.9 - 6.55 \log h_1) \log 1 \\ a(h_2) = (1.1 \log f - 0.7) h_2 \end{cases}$$

where
$R_b$: Propagation loss (dB), f: Frequency (MHz),
$h_1$: Antenna height (m) of base station unit 20,
$h_2$: Antenna height (m) of base station unit 30

Therefore specifically, for example, in a CDMA mobile communication system in which each of the base station units 20a, 20b, and 20c has a means for transmitting its own radio wave transmission power value to the mobile station unit 30, the mobile station unit 30 has a means for measuring a reception power value of radio waves received from these base station units, and the mobile station unit 30 has a means for measuring a difference between the received transmission power value of the base station units and the measured reception power value of the base station units, that is, a propagation loss, there is a method of measuring the propagation loss, calculating a distance 1 using the above [Eq. 14] from the measured propagation loss, and using the calculated distance 1 for the above L1 estimated value in the mobile station unit 30.

It is, however, simply an example of evaluating a precise estimated value 1, but the method is not limited to this.

Figure 7:
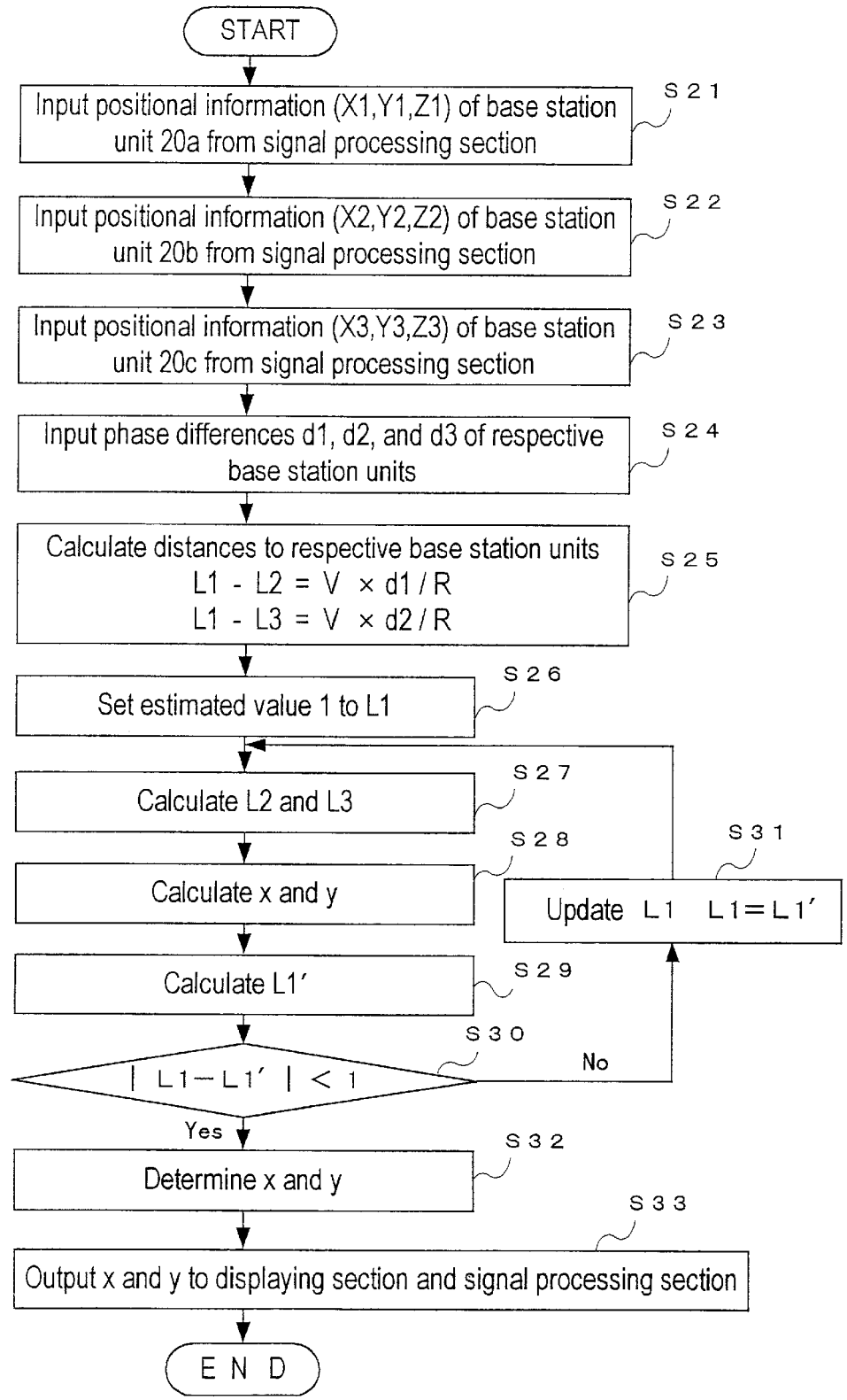
FIG. 7 is a flowchart showing a position calculating processing in a control section of a mobile station unit in a positioning system according to a second embodiment of the present invention.

Next, there is provided a description of a position calculation processing flow for calculating a position of the mobile station unit 30 in the control section 38 of the mobile station unit 30 by using FIG. 7.

The control section 38 inputs positional information (X1, Y1, Z1), (X2, Y2, Z2), and (X3, Y3, Z3) of the base station units 20 from the signal processing section 37 (S21 to S23) and inputs phase differences d1, d2, and d3 between respective base station units 20 (S24).

Next, the control section 38 calculates differences L1–L2 and L1–L3 in distance between the mobile station unit 30 and respective base station units 20 (S25). The calculating method is as follows:

$$L1-L2=V\times d1/R$$

$$L1-L3=V\times d2//R$$

Furthermore, an estimated value 1 is set to an assumed distance L1 as initialization (S26), assumed distances L2 and L3 are calculated based on [Eq. 11] by using L1 and the differences in distance calculated in S25 (S27), an assumed position x, y is calculated based on [Eq. 13] by using L1, L2, and L3(S28), and a calculated distance L1' is obtained based on [Eq. 12] by using the calculated x, y (S29).

Then evaluating an absolute value of a difference between the assumed distance L1 and the calculated distance L1' obtained in S29, the value is determined to be smaller than a required value (1 in FIG. 7) (S30); if it is not smaller (No), the calculated distance L1' obtained in S29 is substituted into the assumed distance L1 for updating (S31) and operations S27 to S30 are repeated.

On the other hand, if the absolute value of the difference is smaller than the required value (1 in FIG. 7) (Yes) in S30, the assumed position x, y obtained in S28 is determined to be a position of the mobile station unit 30 (S32), the x, y values are output to the displaying section 39 and to the signal processing section 37 (S33), and then the position calculation processing is terminated.

The second positioning system is to be applied to a CDMA mobile communication system. By using the second positioning system, a user of the mobile station unit 30 can grasp map information such as his or her own current position, a map of the surroundings, its address, and main facilities without using a GPS requiring a dedicated receiver or antenna.

According to the second positioning system, the position of the mobile station unit 30 is specified only with the positional information reported by three base station units 20a, 20b, and 20c and phase differences from the base station units, the specified position is displayed as coordinates on the displaying section 39 of the mobile station unit 30, and related map information stored in the exchange unit 10 is received on the basis of the positional information and displayed on the displaying section 39, by which the system configuration can be simplified and further the positional information of the mobile station unit can be effectively used by obtaining a map or the like.

Furthermore, in the second positioning system, an assumed distance L1 is supposed to be an estimated value 1 of the distance between the mobile station unit 30 and the first base station unit 20 to calculate an assumed distance between the mobile station unit and other two base station units 20 from the assumed distance L1, an assumed position (x, y) of the mobile station unit is obtained from the calculated assumed distance, an actual calculated distance L1' up to the first base station is obtained from the obtained assumed position (x, y), and the calculation is repeated up to a sufficiently small difference between the assumed distance L1 and the calculated distance L1', by which a precise position measurement can be achieved in a simple logic.

In addition, in the above position calculation logic, by using a distance obtained from a propagation loss, for example for the estimated value 1 of the distance between the mobile station unit and the first base station unit initially set as an initial value, a value approximated to an actual distance can be used as the estimated value, thereby decreasing the number of iterations of the logic continued up to a sufficiently small difference between the assumed distance L1 and the calculated distance L1' and therefore achieving a high-speed position calculating processing.

By using the position calculating method according to the second embodiment for the above example, the position of the mobile station unit 30 can be calculated by using the positional information from three base station units 20a, 20b, and 20c in a simple method, by which an infrastructure of a communication network can be achieved at a low cost.

Next, a third embodiment of the present invention will be described below by referring to accompanying drawings.

A positioning system in a mobile communication system according to the third embodiment of the present invention is a positioning system in a mobile communication system comprising a stationary station unit including an exchange unit and a base station unit and a mobile station unit, in which the stationary station unit reports its own positional information to the mobile station unit, in which the mobile station unit initially calculates differences in distance between the mobile station unit and three stationary station units on the basis of the positional information reported from the three stationary station units and phase differences between the measured stationary station units, calculates the position of the mobile station unit on the basis of the reported positional information and the differences in distance and stores it as previous positional information, and subsequently the mobile station unit calculates differences in distance between the mobile station unit and two stationary station units on the basis of the positional information reported by the two stationary station units and phase differences between the measured stationary station units, calculates a position of the mobile station unit on the basis of the reported positional information of the stationary station units, the differences in distance, and the stored previous positional information of the mobile station unit, stores the calculated positional information as the previous positional information, displays the calculated positional information, and reports the calculated positional information to the stationary station units, and in which the stationary station units report corresponding user information to the mobile station unit on the basis of the reported positional information of the mobile station unit and further the mobile station unit displays the user information reported by the stationary station units.

Accordingly the position of the mobile station unit can be specified initially with the positional information from the three stationary station units and subsequently only with the positional information from two stationary station units and further the specified position can be displayed on the mobile station unit as positional information and displayed by using related user information, by which a system configuration can be simplified, the position be continuously specified for measuring the position in an area in which there are only a few base stations, and further the positional information of the mobile station units be effectively used.

Figure 8:
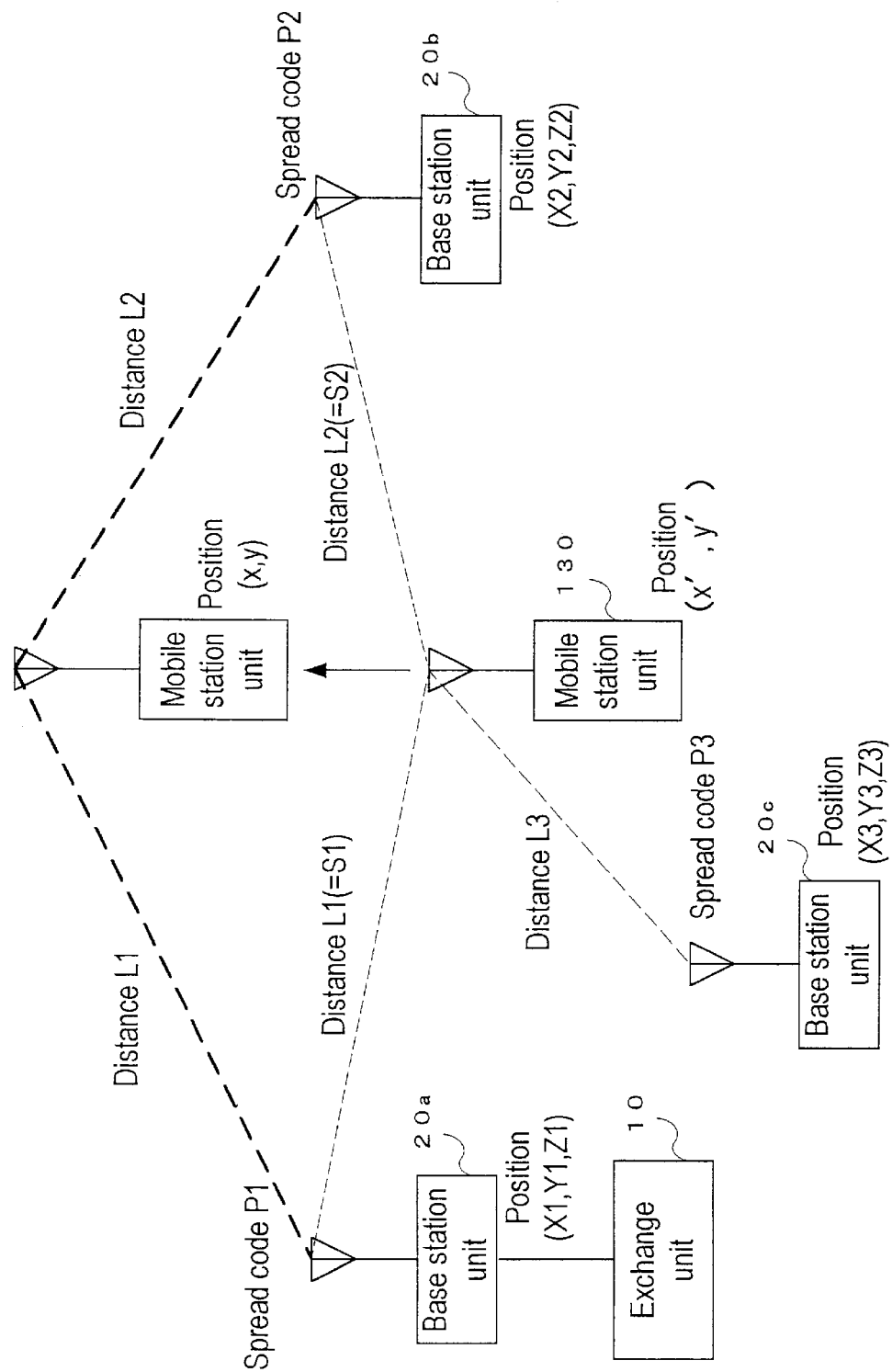
FIG. 8 is a schematic diagram of assistance in explaining an outline of a positioning system in a mobile communication system according to a third embodiment of the present invention.

An outline of the positioning system (a third positioning system) in the mobile communication system according to the third embodiment of the present invention will be described below by referring to FIG. 8. Referring to FIG. 8, there is shown a schematic diagram of assistance in explaining an outline of the positioning system in the mobile communication system according to the present invention.

In a base station unit 20a, a base station unit 20b, and a base station unit 20c in the third positioning system, positional information (X1, Y1), (X2, Y2), and (X3, Y3) representing their own positions are modulated by using a spread code p1, p2, or p3 which is a pseudo random number sequence and then transmitted to the mobile station unit 130.

First, the mobile station unit 130 calculates a difference in distance between the mobile station unit and base station units on the basis of the positional information reported from arbitrary three base station units (the base station unit 20a, the base station unit 20b, and the base station unit 20c in this embodiment) and phase differences between the base station units. Then, the mobile station unit 130 measures its own position (x, y) on the basis of the positional information and the differences in distance to the base station units and stores it as previous positional information (x', y') into the mobile station unit 130.

Accordingly in the next and subsequent measurements the mobile station unit 130 can measure its own position (x, y) after moving by evaluating differences in distance between the mobile station unit 130 and arbitrary two base station units on the basis of the positional information of these base station units (for example, the base station unit 20a and the base station unit 20b) reported therefrom and of the stored previous positional information (x', y') in the above.

It should be noted that, however, the positional information is represented in a two-dimensional orthogonal coordinate system.

If the base station units 20 are synchronous or asynchronous to each other, the mobile station unit 130 can be informed of the time difference by means of a broadcast control channel, for example. In this embodiment, the base station units 20 are synchronous to each other and the spread code start timing is assumed to be the same for the spread codes p1, p2, and p3. The positional information is always transmitted by means of a broadcast control channel, for example.

Figure 9:
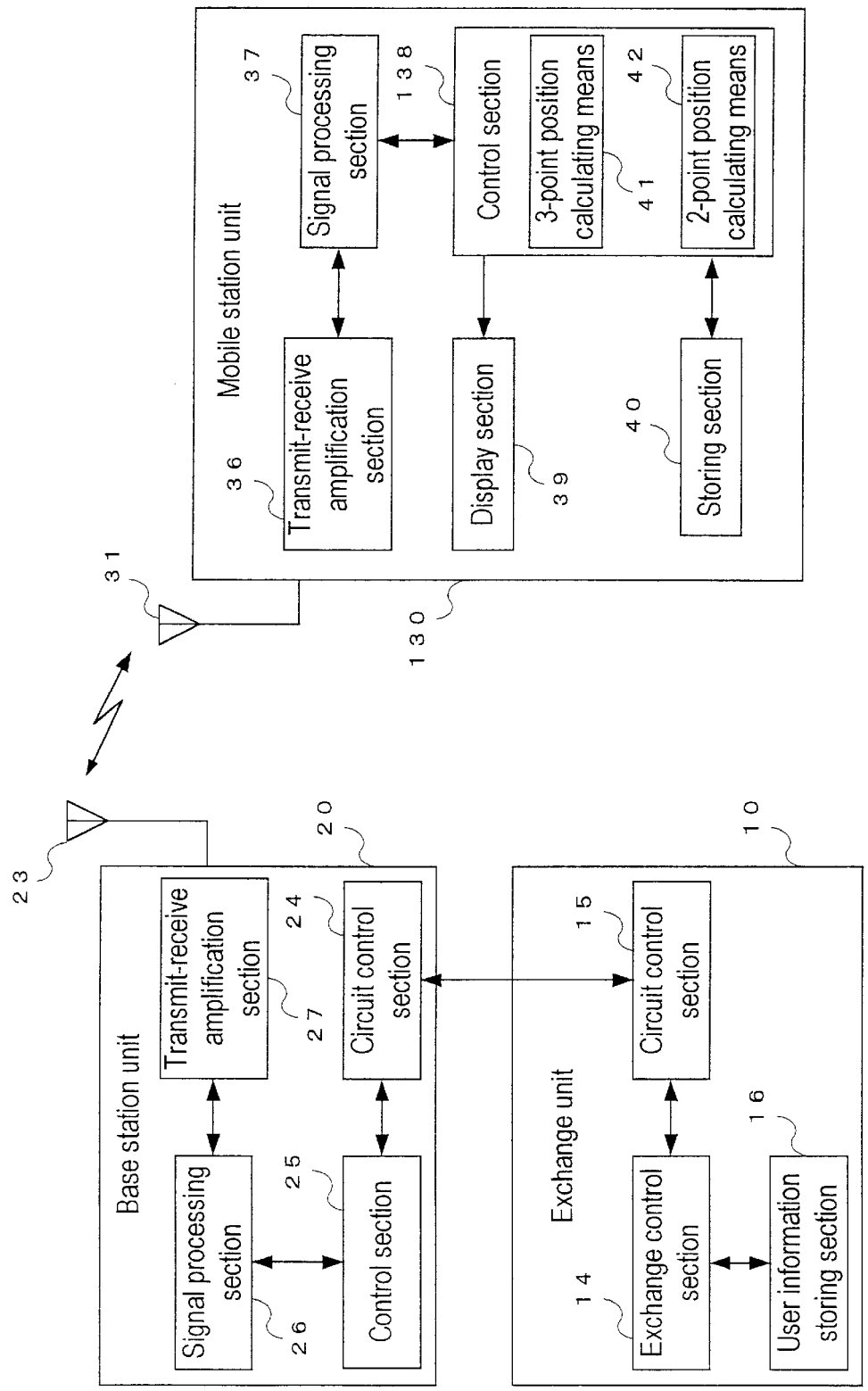
FIG. 9 is a constitutional block diagram of the positioning system in the mobile communication system according to the third embodiment of the present invention.

Next, a description will be given below for a configuration of the positioning system (the third positioning system) in the mobile communication system according to the third embodiment of the present invention by using FIG. 9. Referring to FIG. 9, there is shown a constitutional block diagram of the positioning system in the mobile communication system according to the third embodiment of the present invention.

As shown in FIG. 9, the third positioning system basically comprises an exchange unit 10, a base station unit 20, and a mobile station unit 130, in which the exchange unit 10 includes an exchange control section 14, a circuit control section 15, and a user information storing section 16, the base station unit 20 includes an antenna 23, a circuit control section 24, a control section 25, a signal processing section 26, and a transmit-receive amplification section 27, and the mobile station unit 130 includes an antenna 31, a transmit-receive amplification section 36, a signal processing section 37, a control section 138, a displaying section 39, and a storing section 40.

Although there is shown only a single base station unit 20 in FIG. 9, additional two base station units are initially required for the mobile station unit 130 to obtain its own position and subsequently additional one base station unit is required.

The user information storing section 16 of the exchange unit 10 is used for storing the content of information for displaying information related to the positional information measured by the mobile station unit 130 on the basis thereof; as a concrete example, it stores map information for displaying a surrounding map related to the positional information of the mobile station unit 130 on the basis thereof. As another concrete example, it stores address information for displaying an address of a position on the basis of the positional information of the mobile station unit 130. In addition, the stored information is not limited to map information and address information, but by previously storing various types of information related to the position, various types of service information related to the position can be obtained so as to be displayed.

Subsequently, a configuration in FIG. 9 is compared with a function executing means in claims for description.

In the base station unit 20, the control section 25, the signal processing section 26, the transmit-receive amplification section 27, and the transmit-receive antenna 23 correspond to a position reporting means for reporting a position of the base station unit to the mobile station unit 130 and the circuit control section 24, the control section 25, the signal processing section 26, and transmit-receive amplification section 27 correspond to a user information reporting means for reporting user information reported from the exchange unit 10 to the mobile station unit.

In the mobile station unit, the transmit-receive antenna 31, the transmit-receive amplification section 36, the signal processing section 37, a 3-point position calculating means 41 in the control section 138, and the storing section 40 correspond to a 3-point position measuring means, the transmit-receive antenna 31, the transmit-receive amplification section 36, the signal processing section 37, a 2-point position calculating means 42 in the control section 138, and the storing section 40 correspond to a 2-point position measuring means, the control section 138, the signal processing section 37, and the transmit-receive amplification section 36 correspond to a position reporting means, and the control section 138 and the displaying section 39 correspond to a position information displaying means.

In the exchange unit 10, the user information storing means 16 corresponds to a user information storing means and the exchange control section 14 and the circuit control section 15 correspond to a user information reporting means.

While there is provided an example of displaying surrounding map information or the like on the basis of the positional information of the measured mobile station unit in the following description, the display is not limited to the map information, but it is possible to transmit various types of user information (for example, a map, an address, event information) previously stored in the user information storing section 16 on the exchange unit 10 to the mobile station unit on the basis of the measured positional information for display or other operations by using the transmitted information.

The third embodiment of the present invention is characterized by a method of calculating the position of the mobile station unit by using the positional information reported by the base station units and the phase differences in the mobile station unit 130, and therefore a configuration for executing the position calculation is described below.

In the mobile station unit 130, the components for calculating the position of the mobile station unit are the 3-point position calculating means 41 and the 2-point position calculating means 42 in the control section 138.

The 3-point position calculating means 41 calculates differences in distance between the mobile station unit and three base station units on the basis of the positional information reported by the three base station units 20 and phase differences between the base station units, measures its own position (x, y) from the positional information and the differences in distance between the mobile station unit and the base station units, and stores it into the storing section 40 as previous positional information in (x', y').

As for a method of specifying the position of the mobile station unit on the basis of the positional information from the three base stations, it is possible to use the position calculating method described in the first and second embodiments.

The 2-point position calculating means 42 calculates differences in distance between the mobile station unit 130 and arbitrary two base station units on the basis of positional information thereof reported from the arbitrary two base station units and phase differences of the two measured base station units and calculates and stores its own position (x, y) after moving, in the characterizing portion of the present invention.

Next, a concrete method of realizing the 2-point position calculating means 42 in the control section 138 of the mobile station unit 130 will be described below by giving an example of measuring its own position (x, y) on the basis of the previous positional information (x', y') and of the positional information (X1, Y1) and (X2, Y2) of the two base station units.

First, the mobile station unit 130 obtains the positional information (X1, Y1) and (X2, Y2) reported by arbitrary two base station units, the base station unit 20a and the base station unit 20b in this example, from the signal processing section 37 and obtains a phase difference d1 from the spread codes p1 and p2 from the signal processing section 37.

The definition of the phase difference is as described in detail in the above Japanese Patent Application No. 11-323759.

In addition, there is a relationship as expressed by [Eq. 15] in the distance L1 or L2 between the previous position (x', y') of the mobile station unit 130 stored in the storing section 40 and the base station unit 20a (X1, Y1) or the base station unit 20b (X2, Y2).

[Eq. 15]

$$\begin{cases} \{(X_1 - x)^2 + (Y_1 - y)^2\}^{1/2} = L_1 \\ \{(X_2 - x)^2 + (Y_2 - y)^2\}^{1/2} = L_2 \end{cases}$$

Furthermore, L2 can be expressed by [Eq. 16] using L1 and the phase difference d1 from the spread codes p1 and p2. In the equation [Eq. 16], V denotes the radio wave propagation speed, R denotes the number of chips per unit time of the spread code, and the definition of the chip and the like are as described in detail in the above Japanese Patent Application No. 11-323759.

[Eq. 16]

$$L_2 = L_1 - V \times d_1 / R$$

If the previous information (x', y') of the mobile station unit 130 stored in the storing section 40 is treated as assumed values of the position (x, y) of the required mobile station unit 130 and the position (x, y) is expressed by using moving amounts (corrected values) dx and dy, the relation can be expressed by $$x = x' + dx, \quad y = y' + dy$$

Supposing that dx and dy are sufficiently smaller than x and y, linearization is executed by using a Tailor expansion, then [Eq. 15] can be expressed by [Eq. 17] as follows:

[Eq. 17]

$$a_1 dx + b_1 dy = L_1 - S_1$$

$$a_2 dx + b_2 dy = L_2 - S_2$$

A display of the above [Eq. 17] in a matrix can be expressed by [Eq. 18].

[Eq. 18]

$$\begin{pmatrix} a_1 & b_1 \\ a_2 & b_2 \end{pmatrix} \begin{pmatrix} dx \\ dy \end{pmatrix} = \begin{pmatrix} L_1 - S_1 \\ L_2 - S_2 \end{pmatrix} \text{ where}$$

$$\begin{cases} a_i = \dfrac{\partial L_i}{\partial x} = -\dfrac{X_i - x'}{S_i} \\ b_i = \dfrac{\partial L_i}{\partial y} = -\dfrac{Y_i - y'}{S_i} \\ S_i = \{(X_i - x')^2 + (Y_i - y')^2\}^{1/2} \\ (i = 1, 2) \end{cases}$$

The values dx and dy are obtained from the above [Eq. 18] and a calculated position (x, y) of the mobile station unit 130 is obtained from x=x'+dx and y=y'+dy.

Then, the above calculation is repeated until the absolute values of dx and dy reach required sufficiently small values (for example, 1); if both of the absolute values of dx and dy are smaller than 1 or the calculation is repeated by a specific number of times (for example, 10 times), the calculated position (x, y) at that time is considered to be a position of the mobile station unit 130.

Figure 10:
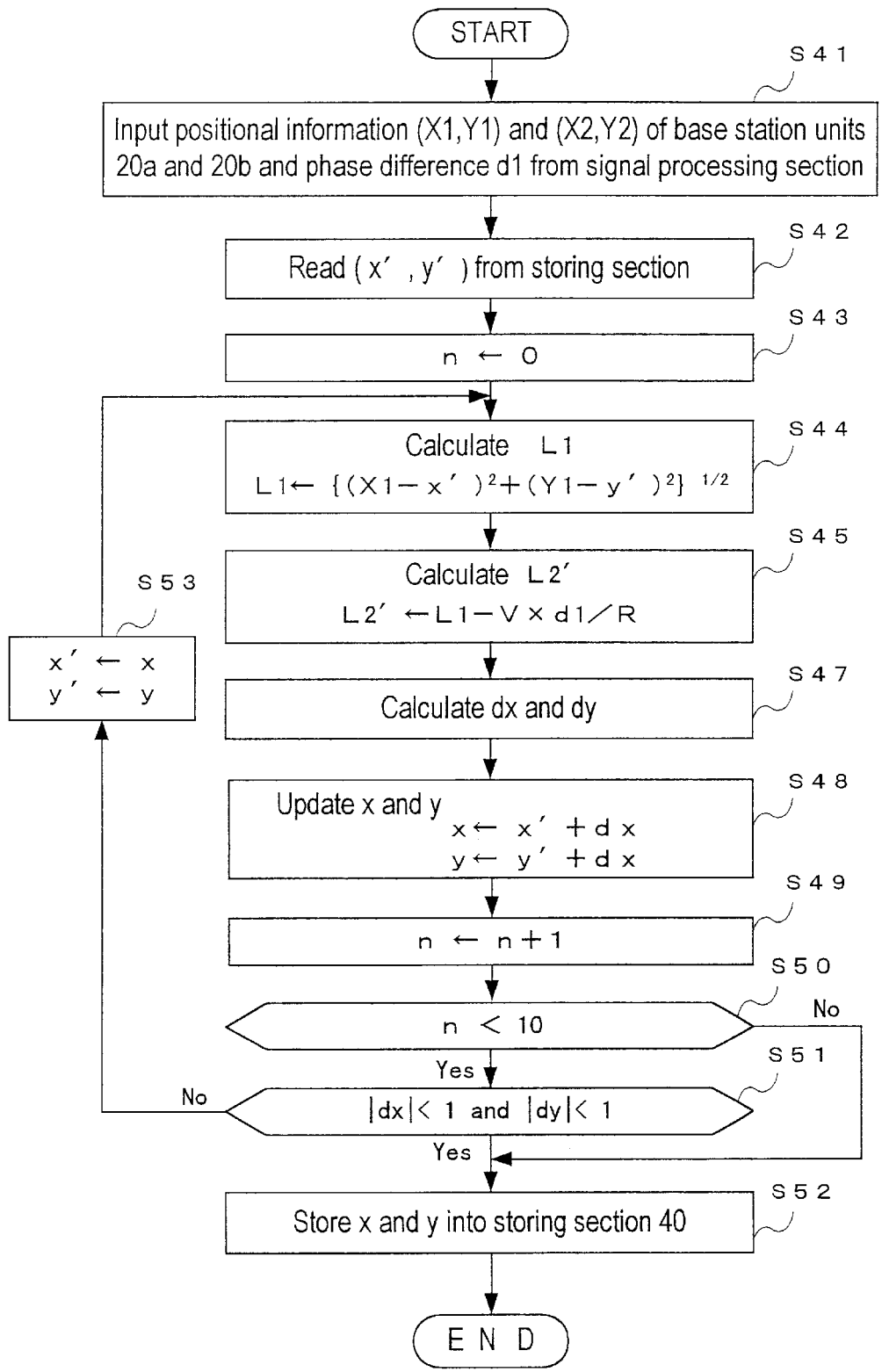
FIG. 10 is a flowchart showing processing of 2-point position calculating means in a control section of a mobile station unit in the positioning system according to the third embodiment of the present invention.

A concrete processing content of the 2-point position calculating means 42 will be described below by using FIG. 10. Referring to FIG. 10, there is shown a flowchart of processing of the 2-point position calculating means in the control section of the mobile station units.

The 2-point position calculating means in the control section 138 inputs the positional information (X1, Y1) and (X2, Y2) of two base station units 20 from the signal processing section 37 and phase difference d1 between the two base station units 20 (S41), reads the previous positional information (x', y') from the storing section 40, and substitute an initial value 0 into variable n for counting the number of loops (S43).

Subsequently, the previous positional information (x', y') read from the storing section 40 is used as an assumed position of the required position (x, y), an assumed distance L1 between the mobile station unit 130 and the base station unit 20a is obtained by a calculation of [Eq. 15] (S44), and then an assumed distance L2' between the mobile station unit 130 and the base station unit 20b is calculated by using [Eq. 16] (S45).

Then the previous positional information (x', y') read from the storing section 40 is used as an estimated position (x', y') of the required position (x, y), dx and dy are obtained by a calculation of [Eq. 18] with X1, Y1, X2, Y2, x', y', L1, and L2', and then the obtained dx and dy are added to x' and y' to obtain a calculated position (x, y) (S48).

After that, the counter n is incremented (S49) and it is judged whether or not n is smaller than 10 (S50); if it is smaller (Yes), it is judged whether or not both of the absolute values of dx and dy are smaller than 1 (S51). If both of them are not smaller (No), the calculated position (x, y) obtained in S48 is substituted into the estimated position (x', y') (S53) and then the control returns to S44 to repeat the calculation.

On the other hand, if the counter n is 10 or greater (No) in S50 and both of the absolute values of dx and dy are smaller than 1 in S51 (Yes), the calculated position (x, y) is considered to be a position of the mobile station unit for a display or the like and stored in the storing section 40 to be used for the next position measurement (S52) and then the 2-point position measurement processing is terminated.

Next, the processing operation in the configuration of the third positioning system will be described below by using FIGS. 8 and 9.

In FIGS. 8 and 9, the base station unit 20a, the base station unit 20b, or the base station unit 20c transmits its own position (X1, Y1), (X2, Y2), or (X3, Y3) as positional information from the control section 25 passing through the signal processing section 26, where the information is modulated by using spread code p1, p2, or p3 which is a pseudo random number sequence, and then amplifies it in the transmit-receive amplification section 29 to transmit it to the mobile station unit 130 by means of radio waves from the antenna 23.

In the mobile station unit 130, the control section 138 obtains the positional information reported from arbitrary three base station units (the base station unit 20a, the base station unit 20b, and the base station unit 20c in this embodiment) via the antenna 31, the transmit-receive amplification section 36, and the signal processing section 37, the control section 138 obtains phase differences between the base station units obtained in the signal processing section 37 so as to calculate differences in distance between the mobile station unit and the base station units from the obtained positional information of the base station units and the phase differences in the method described, first in Japanese Patent Application No. 11-323759, as an operation of the 3-point position calculating means 41, and the mobile station unit 130 measures its own position (x, y) on the basis of the positional information and the differences in distance to the base station units and stores the position into the storing section 40.

Considering the positional information stored in the storing section 40 to be previous positional information (x', y') after the subsequent measurements, the mobile station unit 130 measures its own position (x, y) on the basis of the positional information of arbitrary two base station units reported therefrom and of the differences in distance between the mobile station unit 130 and the base station units and stores the measurement result into the storing section 40.

Then the position of the mobile station unit 130 measured in the method of the present invention is output to the displaying section 39 for displaying its own position, and it is also possible to output the position to the signal processing section 37 to transmit it to the exchange unit 10 via the base station unit 20 in order to display related map information of surroundings of the position obtained from the exchange unit 10 or to display an address obtained from the exchange unit 10 on the mobile station unit 130.

According to the positioning system and the position calculating method in the mobile communication system according to the third embodiment of the present invention, a position of a mobile station unit 130 is measured by using positional information from three or more base station units 20 only in the first measurement and phase differences, the measurement result is stored in the storing section 40, and in the next and subsequent measurements the position of the mobile station unit 130 is calculated by using the previous stored positional information of the mobile station unit 130 and positional information from two base station units 20 in addition to phase differences, and therefore only if a user can measure his or her own position in a city area or the like where three or more base station units can be picked up at the first time, he or she can measure his or her own position continuously in the suburbs where two or more base station units can be picked up simultaneously in the subsequent measurements advantageously.

In addition the positional information of the mobile station unit measured in the above method is transmitted to the exchange unit 10 via the base station units 20, user information corresponding to the transmitted positional information is obtained in the exchange unit 10 and then transmitted to the mobile station unit 130, and map information, address information, or various types of service information is displayed on the displaying section 39 of the mobile station unit, and therefore the positional information of the mobile station unit can be effectively used advantageously.

According to the present invention, there is provided a positioning system in a mobile communication system comprising a stationary station unit and a mobile station unit, in which the stationary station unit reports its positional information to the mobile station unit, in which the mobile station unit calculates differences in distance between the mobile station units and three stationary station units on the basis of the positional information reported from the three stationary station units and of a phase difference between the measured stationary station units, measures the position of the mobile station unit on the basis of the reported positional information and the differences in distance, displays the information of the measured position, and reports the information of the measured position to the stationary station units, and in which the stationary station units report corresponding map information to the mobile station unit on the basis of the reported positional information of the mobile station unit and further the mobile station unit displays the map information reported by the stationary station units, and therefore the position of the mobile station unit can be specified only with the positional information from the three stationary station units and further the specified position can be displayed on the mobile station unit by using the positional information and the map information, by which a system configuration can be simplified and the positional information of the mobile station unit can be effectively used.

According to the present invention, differences in distance between the mobile station unit and three base station units are calculated on the basis of the positional information reported from the three base station units and a phase difference between the measured base station units, an estimated distance between the mobile station unit and the first base station unit is set to an estimated distance as initialization, an assumption is made also on distances between the mobile station unit and other base station units, an assumed position of the mobile station unit is calculated by using the assumed distances between the mobile station unit and the base station units and the positional information reported by the base station units, the calculation is repeated with a feedback from the calculated distance to the assumed distance up to a sufficiently small difference between the calculated distance to the first base station unit obtained on the basis of the calculated assumed position and the assumed distance to the first base station unit, and an assumed position corresponding to the sufficiently small difference between the calculated distance and the assumed distance is considered to be a position of the mobile station unit, and therefore it is possible to calculate the position precisely in a simple logic and further to reduce the position calculation processing time by approximating the estimated distance as the initialization to an actual distance.

According to the present invention, there is provided a positioning system in a mobile communication system comprising a stationary station unit and a mobile station unit, in which the stationary station unit reports their positional information to the mobile station unit, in which the mobile station unit calculates a position of the mobile station unit on the basis of the positional information reported by three stationary station units and of a phase difference between the measured stationary station units and stores it as previous positional information, subsequently calculates differences in distance between the mobile station unit and respective base station units on the basis of the positional information reported by two stationary station units and the phase difference between the measured stationary station units, calculates a position of the mobile station unit on the basis of the positional information of the stationary station units, the differences in distance, and the stored previous positional information of the mobile station unit, displays the information of the calculated position, and reports the information of the calculated position to the stationary station units, and in which the stationary station units report corresponding user information to the mobile station unit on the basis of the reported positional information of the mobile station unit and further the mobile station unit displays the user information reported by the stationary station units, and therefore the position of the mobile station unit can be specified initially with the positional information from three stationary station units and subsequently only with the positional information from two stationary station units and further the specified position can be displayed on the mobile station unit by using the positional information and the user information, by which a system configuration can be simplified, the position can be continuously measured in an area in which there are only a few base stations, and further the positional information of the mobile station unit can be effectively used.

What is claimed is:

1. A positioning system in a mobile communication system comprising a stationary station unit and a mobile station unit, wherein said stationary station unit reports its positional information to said mobile station unit; and wherein said mobile station unit calculates differences in distance between said mobile station unit and three stationary station units on the basis of positional information reported from said stationary station units and phase differences between said measured stationary station units, calculates a position of the mobile station unit on the basis of said differences in distance until predetermined minimum correction values of positional information of the mobile station unit are obtained.

2. A positioning system in a mobile communication system comprising a stationary station unit and a mobile station unit, wherein said stationary station unit reports its positional information to said mobile station unit; and wherein said mobile station unit calculates differences in distance between said mobile station unit and three stationary station units on the basis of positional information reported from said stationary station units and phase differences between said measured stationary station units, calculates average values of the positions of said three stationary units as assumed values x', v' and z', calculates correction values on the basis of the differences in distance and the assumed values, updates the assumed values by adding the calculated correction values, repeats the calculations of the correction values and updates the assumed values until the calculated correction values satisfy a specific condition, and determines the updated assumed values as a position x, y and z of the mobile station unit when the correction values satisfy the specific condition.

3. A positioning system in a mobile communication system, comprising an exchange unit, a base station unit, and a mobile station unit, wherein said base station unit transmits positional information of the base station unit to the mobile station unit;

wherein said mobile station unit calculates differences in distance between said mobile station unit and three base station units on the basis of positional information transmitted from said base station units and phase differences between said measured base station units, calculates a position of the mobile station unit on the basis of said differences in distance until predetermined minimum correction values of positional information of the mobile station unit are obtained, transmits the information of said position to said exchange unit, and displays obtained received map information from said exchange unit; and wherein said exchange unit stores map information, obtains corresponding map information from said stored map information on the basis of said positional information transmitted from said mobile station unit, and transmits the map information to transmit it to said mobile station unit.

4. A positioning system in a mobile communication system, comprising an exchange unit, a base station unit, and a mobile station unit, wherein said base station unit transmits positional information of the base station unit to the mobile station unit;

wherein said mobile station unit calculates differences in distance between said mobile station unit and three base station units on the basis of positional information transmitted from said base station units and phase differences between said measured base station units, calculates average values of the positions of said three base station units as assumed values x', y' and z', calculates correction values on the basis of the differences in distance and the assumed values, updates the assumed values by adding the calculated correction values, repeats the calculations of the corrected values and updates the assumed values until the calculated correction values satisfy a specific condition, determines the updated values as a position x, y and z of the mobile station unit when the correction values satisfy the specific condition, transmits information of the determined position to said exchange unit, and displays received map information from said exchange unit; and wherein said exchange unit stores map information, obtains corresponding map information from the stored map information on the basis of the positional information transmitted from said mobile station unit, and transmits the map information to said mobile station unit.

5. The positioning system in a mobile communication system according to claim 2,
   wherein the specific condition is that absolute values of the correction values are smaller than 1.

6. A position calculating method for calculating a position of a mobile station unit, comprising the steps of:
   obtaining positional information (X1, Y1, Z1) of a first base station, positional information (X2, Y2, X2) of a second base station, and positional information (X3, Y3, Z3) of a third base station unit;
   calculating differences in distance between the mobile station unit and said base station units L1−L2(=V×d1/R) and L1−L3(=V×d2/R), L2−L3(=V×d3/R) by using the radio wave propagation speed V and the number of chips per unit time of a spread code R on the basis of phase differences d1, d2, and d3 between said base station units;
   calculating average values x'=(X1+X2+X3)/3, y'=(Y1+Y2+Y3)/3, z'=(Z1+Z2+Z3)/3 of positions of said three base station units as initialization;
   where x=x'+dx, y=y'+dy, and z=z'+dz if (x, y, z) is expressed by using corrected values dx, dy, and dz of x, y, and z for the position (x, y, z) of a required mobile station unit and said x', y' and z';
   calculating dx and dy with linearization with a Taylor expansion supposing that dx, dy, and dz are sufficiently smaller than x, y, and z on the basis of these equations of x, y, and z and an equation in which said differences in distance are expressed with said positions of said three base station units (x, y, z), by using a determinant of a conventional equation AΔ=F obtained assuming that said phase difference error is 0 (where A denotes a matrix represented by coefficients when representing the differences in distance between said mobile station unit and said base station units by dx, dy, and dz, Δ denotes a matrix of dx, dy, and dz, and F is a matrix related to said differences in distance);
   substituting said calculated dx and dy into said equations x=x'+dx and y=y'+dy to obtain x and y and further calculating dx and dy using said conditional expression AΔ=F assuming that the obtained x, y to be x', y'; and
   calculating the position of said mobile station unit by repeating said calculation until absolute values |dx| and |dy| of said calculated dx and dy become smaller than 1 to consider the values of x' and y' obtained when |dx| and |dy| become smaller than 1 to be x, y coordinates and by evaluating the z coordinate from z=(Z1+Z2+Z3)/3.

7. The position calculating method according to claim 6 for calculating the position of said mobile station unit supposing said determinant AΔ=F to be a conditional expression,
   wherein, supposing that the distances between the mobile station unit and the base station units are L1, L2, and L3, the differences in distance between said mobile station unit and said base station units can be expressed by D1=L1−L2, D2=L1−L3, and D3=L2−L3;
   wherein the differences in distance can be expressed by using the phase differences d1, d2, and d3 between said base station units, the radio wave propagation speed V, the number of chips per unit time of a spread code R, and residuals v1, v2, and v3 given by measurement errors of said phase differences as follows:

$D1=L1-L2=V\times d1/R+v1$ $D2=L1-L3=V\times d2/R+v2$ $D3=L2-L3=V\times d3/R+v3;$ wherein further said differences in distance can be expressed on the basis of the positional coordinates (X1, Y1, Z1), (X2, Y2, Z2), and (X3, Y3, Z3) of three base station units and the positional coordinates (x, y, z) of said mobile station unit as follows:

$$D1 = L1 - L2 = \{(X1-x)^2 + (Y1-y)^2 + (Z1-z)^2\}^{1/2} - \{(X2-x)^2 + (Y2-y)^2 + (Z2-z)^2\}^{1/2}$$

$$D2 = L1 - L3 = \{(X1-x)^2 + (Y1-y)^2 + (Z1-z)^2\}^{1/2} - \{(X3-x)^2 + (Y3-y)^2 + (Z3-z)^2\}^{1/2}$$

$$D3 = L2 - L3 = \{(X2-x)^2 + (Y2-y)^2 + (Z2-z)^2\}^{1/2} - \{(X3-x)^2 + (Y3-y)^2 + (Z3-z)^2\}^{1/2};$$

wherein x, y, and z can be expressed by using assumed values x', y' and z' and their corrected values dx, dy, and dz as follows:

$x=x'+dx$ $y=y'+dy$ $z=z'+dz$ wherein, substituting said equations of x, y, and z into said equations of D1, D2, and D3 and determining that dx, dy, and dz are sufficiently smaller than x, y, and z, they can be linearized using Taylor expansions as follows:

$D1=S1-S2+a1\cdot dx+b1\cdot dy+c1\cdot dz-(a2\cdot dx+b2\cdot dy+c2\cdot dz)$ $D2=S1-S3+a1\cdot dx+b1\cdot dy+c1\cdot dz-(a3\cdot dx+b3\cdot dy+c3\cdot dz)$ $D3=S2-S3+a2\cdot dx+b2\cdot dy+c2\cdot dz-(a3\cdot dx+b3\cdot dy+c3\cdot dz)$ wherein $Si=\{(Xi-x)^2+(Yi-y)^2+(Zi-z)^2\}^{1/2}$ wherein the following observation equations are derived from the above:

$v1=(a1-a2)dx+(b1-b2)dy+(c1-c2)dz+S1-S2-V\times d1/R$ $v2=(a1-a3)dx+(b1-b3)dy+(c1-c3)dz+S1-S3-V\times d2/R$ $v3=(a2-a3)dx+(b2-b3)dy+(c2-c3)dz+S2-S3-V\times d3/R$ wherein if v=0 said observation equations can be expressed as follows:

$(a1-a2)dx+(b1-b2)dy+(c1-c2)dz=V\times d1/R-S1+S2$ $(a1-a3)dx+(b1-b3)dy+(c1-c3)dz=V\times d2/R-S1+S3$ $(a2-a3)dx+(b2-b3)dy+(c2-c3)dz=V\times d3/R-S2+S3$ wherein said three equations can be expressed in the following determinant:

$A\Delta=F$ where A is a matrix with a1, a2, a3, b1, b2, b3, c1, c2, and c3, Δ is a matrix with dx, dy, and dz, F is a matrix with V, d1, d2, d3, S1, S2, and S3.

8. A position calculating method of a positioning system in a mobile communication system comprising a base station unit and a mobile station unit, the method comprising the steps of:

calculating differences in distance between the mobile station unit and three base station units on the basis of positional information reported from said three base station units and phase differences between the measured base station units;

setting an estimated distance between said mobile station unit and a first base station unit to an assumed distance as initialization;

assuming also distances between said mobile station unit and other base station units on the basis of the assumed distance;

calculating an assumed position of the mobile station unit by using the assumed distances between the mobile station unit and the base station units and the positional information reported from the base station units;

repeating the calculation with a feedback from a calculated distance to an assumed distance until a difference is decreased to be lower than a specific value between the calculated distance to the first base station unit obtained on the basis of the calculated assumed position and the assumed distance to the first base station unit; and determining an assumed position obtained when the difference between the calculated distance and the assumed distance becomes sufficiently lower than the specific value to be a position of the mobile station unit.

9. A position calculating method comprising the steps of:

obtaining positional information (X1, Y1, Z1) of a first base station unit, positional information (X2, Y2, Z2) of a second base station unit, and positional information (X3, Y3, Z3) of a third base station unit;

calculating differences in distance L1−L2(=V×d1/R) and L1−L3(=V×d2/R) between a mobile station unit and said base station units on the basis of phase differences d1, d2, and d3 between said base station units by using the radio wave propagation speed V and the number of chips per unit time of a spread code R;

setting an estimated value 1 of the distance between said mobile station unit and said first base station unit to an assumed distance L1 as initialization;

evaluating assumed distances L2 and L3 between said mobile station unit and other base station units by using said L1 and the equations of the differences in distance between said mobile station unit and said base station units;

evaluating as assumed position x, y of said mobile station unit on the basis of said L1, L2, and L3 obtained and the positional information of said base station units;

evaluating a distance L1' between said evaluated x, y and said positional information (X1, Y1) of said first base station as a calculated distance on the basis thereof;

substituting said L1' into L1 until an absolute value of the distance between said assumed distance L1 and said calculated distance L1' is smaller than a specific value and repeating said calculation; and specifying the assumed position x, y corresponding to the absolute value of said difference smaller than the specific value as a position of said mobile station unit.

10. The position calculating method according to claim 9, wherein the distance evaluated on the basis of the propagation loss from the first base station unit to the mobile station unit is specified as an estimated value 1 of the distance between said mobile station unit and said first base station unit for initialization in L1.

11. A positioning system in a mobile communication system comprising a stationary station unit and a mobile station unit, wherein said stationary station unit reports positional information thereof to said mobile station unit; and wherein said mobile station unit calculates differences in distance between said mobile station unit and three stationary station units on the basis of positional information of said three stationary station units reported therefrom and phase differences between the measured stationary station units, calculates a position of the mobile station unit on the basis of the positional information of said stationary station units and said differences in distance, stores the calculated positional information of said mobile station unit as previous positional information, and subsequently calculates differences in distance between said mobile station unit and two stationary station units on the basis of the positional information of said two stationary station units reported therefrom and phase differences between said measured two stationary station units, calculates a position of the mobile station unit on the basis of the positional information of said stationary station units, said differences in distance, and said stored previous positional information of said mobile station unit, and stores information of said calculated position as previous positional information.

12. The positioning system according to claim 11, wherein said mobile station unit reports the information of the calculated position to said stationary station units;

wherein said stationary station units reports corresponding user information to said mobile station unit on the basis of said reported positional information of said mobile station unit; and wherein said mobile station unit displays said user information reported from said stationary station units.

13. A positioning system in a mobile communication system comprising an exchange unit, a base station unit, and a mobile station unit, wherein said base station unit transmits positional information of the corresponding base station unit to the mobile station unit;

wherein said mobile station unit calculates differences in distance between said mobile station unit and three base station units on the basis of positional information of said base station units transmitted therefrom and phase differences between said measured base station units, calculates a position of the mobile station unit on the basis of said positional information of said base station units and said differences in distance, stores said calculated positional information of the mobile station unit as previous positional information, and subsequently calculates differences in distance between said mobile station unit and two base station units on the basis of positional information of said two base station units reported therefrom and phase differences between said two base station units, calculates a position of the mobile station unit on the basis of said positional information of said base station units, said differences in distance, and said stored previous positional information of the mobile station unit, stores information of said calculated position as previous positional information, transmits the information of the calculated position to said exchange unit, and displays received user information; and wherein said exchange unit previously stores user information related to the positional information from said mobile station unit and obtains corresponding user information from said stored user information on the basis of the positional information transmitted from said mobile station unit to transmit it to said mobile station unit.

14. A positioning system in a mobile communication system comprising an exchange unit, a base station unit, a mobile station unit, wherein said base station unit comprises position reporting means for reporting positional information of the corresponding base station unit to said mobile station unit and user information reporting means for reporting user information reported from said exchange unit to the corresponding mobile station unit;

wherein said mobile station unit comprises 3-point position measuring means for calculating differences in distance between said mobile station unit and three base station units on the basis of positional information of said three base station units reported therefrom and phase differences between said measured base station units and for calculating a position of the mobile station unit on the basis of said positional information and said differences in distance to store it as previous positional information, 2-point position measuring means for calculating differences in distance between said mobile station unit and two base station units on the basis of positional information of said two base station units reported therefrom and phase differences between said measured two base station units and for calculating a position of the mobile station unit on the basis of said positional information of said base station units, said differences in distance, and said stored previous positional information of the mobile station unit to store it as previous positional information, position reporting means for outputting information of the calculated position for displaying and reporting it to said exchange unit, and user information displaying means for displaying information of said output position for displaying and user information reported from said exchange unit; and wherein said exchange unit obtains corresponding user information from user information storing means on the basis of the information from said user information storing means for storing user information and the information of the position reported from said mobile station unit and reports it to said mobile station unit via said base station units.

15. A positioning system in a mobile communication system comprising an exchange unit, a base station unit, and a mobile station unit, wherein said base station unit comprises a control section for outputting positional information representing a position of the base station unit and obtaining positional information of a position of the mobile station unit therefrom, a circuit control section for transmitting said positional information of said mobile station unit to said exchange unit and receiving user information from said exchange unit, a signal processing section for modulating said positional information of the base station units and said user information with a spread code and demodulating said received positional information of said mobile station unit with said spread code, and a transmit-receive amplification section for transmitting said modulated signal and receiving said positional information from said mobile station unit;

wherein said mobile station unit comprises a transmit-receive amplification section for receiving said signal transmitted from said base station unit and transmitting the signal to said base station unit, a signal processing section for performing synchronization of the received signal and demodulation with said spread code, for outputting positional information from three or two base station units, and for modulating positional information of the mobile station unit with said spread code in order to measure phase differences between respective base station units and to transmit the calculated positional information of the mobile station unit to said exchange unit via said base station units, a control section for calculating differences in distance between said mobile station unit and said three base station units on the basis of the phase differences between said three base station units, for calculating a position of the mobile station unit on the basis of the positional information of said there base station units and said differences in distance to store it as previous positional information, for subsequently calculating differences in distance between said mobile station unit and said two base station units on the basis of the phase differences between said two base station units, and for calculating a position of the mobile station unit on the basis of the positional information of said two base station units, said differences in distance, and said previous positional information, a storing section for storing said calculated positional information of the mobile station unit as previous positional information, and a displaying section for displaying said calculated positional information and said user information transmitted from said exchange unit; and wherein said exchange unit comprises a user information storing section for storing the user information, a circuit control section for receiving said positional information of said mobile station unit from said base station unit and transmitting said user information, and an exchange control section for obtaining related user information from said user information storing section on the basis of said received positional information of the mobile station unit and outputting it to said circuit control section.

16. A position calculating method of a positioning system in a mobile communication system comprising a base station unit and a mobile station unit, comprising the steps of:

calculating a position of the mobile station unit on the basis of positional information reported from three base station units and phase differences between measured base station units and storing information of said calculated position as previous positional information (x', y');

subsequently calculating differences in distance between said mobile station unit and respective base station units on the basis of positional information reported from two base station units and phase differences between said measured base station units and using said stored previous positional information (x', y') as initialization of an estimated distance of the required mobile station unit;

specifying corrected values dx, dy from information of said estimated position (x', y') for a position (x, y) of the required mobile station unit;

calculating dx, dy by linearization with a Taylor expansion determining that dx and dy are sufficiently low relative to x and y on the basis of the distance evaluated from the estimated position and the positions of said two base station units, and the differences in distance between the mobile station unit and the base station units evaluated from said measured phase differences;

evaluating a calculated position (x, y) by using said calculated dx and dy and using said evaluated x and y as an estimated position (x', y'); and repeating the calculation with feedback from said calculated position to the estimated position until said calculated dx and dy become smaller than a specific value or up to the specific number of calculations and specifying the calculated position (x, y) corresponding to dx and dy smaller than said specific value or obtained after the repetitions by the specific number of calculations as a position of the mobile station unit.

17. A position calculating method of positioning system in a mobile communication system comprising a base station unit and a mobile station unit, comprising the steps of:

storing a position of a mobile station unit obtained on the basis of positional information of three base station units and phase differences between said base station units as previous positional information (x', y');

obtaining positional information (X1, Y1) of a first base station unit and positional information (X2, Y2) of a second base station unit;

calculating a difference in distance L1−L2(=V×d1/R) between the mobile station unit and each of said base station units by using radio wave propagation speed V and the number of chips per unit time of a spread code R from a phase difference d1 between said base station units;

using said stored positional information (x', y') as initialization of an estimated position of the required mobile station unit;

having x=x'+dx and y=y'+dy when (x, y) is expressed by using the corrected values dx and dy for the position (x, y) of the required mobile station unit and said estimated position (x', y');

calculating dx and dy by linearization with a Taylor expansion determining that dx and dy are sufficiently smaller than x and y from these equations of x and y and equations expressing said distance between the mobile station unit and each of said base station units by using the positions of said two base station units and the estimated position (x', y');

substituting said calculated dx and dy into said equations x=x'+dx and y=y'+dy to evaluate the calculated position (x, y); and repeating said calculation by using said evaluated calculated position (x, y) as the estimated position (x', y') until absolute values |dx| and |dy| of said calculated dx and dy become smaller than 1 or up to the specific number of calculations and specifying the calculated position (x, y) corresponding to |dx| and |dy| smaller than 1 or obtained after said specific number of calculations as a position of said mobile station unit.

* * * * *